US011008166B2

(12) United States Patent
Gravelle et al.

(10) Patent No.: US 11,008,166 B2
(45) Date of Patent: May 18, 2021

(54) STORAGE AND RETRIEVAL SYSTEMS SHARING A COMMON ROBOTIC FLEET BETWEEN A STORAGE GRID AND EXTERNAL WORKSTATIONS

(71) Applicant: Attabotics Inc., Calgary (CA)

(72) Inventors: Scott Gravelle, Calgary (CA); Winston Hope, Calgary (CA); Darin Rousseau, Calgary (CA)

(73) Assignee: Attabotics Inc., Calgary (CA)

( * ) Notice: Subject to any disclaimer, the term of this patent is extended or adjusted under 35 U.S.C. 154(b) by 148 days.

(21) Appl. No.: 16/374,123

(22) Filed: Apr. 3, 2019

(65) Prior Publication Data

US 2019/0375589 A1   Dec. 12, 2019

Related U.S. Application Data

(60) Provisional application No. 62/682,691, filed on Jun. 8, 2018, provisional application No. 62/770,788, filed on Nov. 22, 2018.

(51) Int. Cl.
| | |
|---|---|
| *B65G 1/04* | (2006.01) |
| *B65G 1/137* | (2006.01) |
| *B65G 1/12* | (2006.01) |
| *B65G 1/06* | (2006.01) |

(52) U.S. Cl.
CPC ......... *B65G 1/1373* (2013.01); *B65G 1/0464* (2013.01); *B65G 1/0478* (2013.01); *B65G 1/0492* (2013.01); *B65G 1/065* (2013.01); *B65G 1/12* (2013.01); *B65G 1/137* (2013.01)

(58) Field of Classification Search
CPC ........................... B65G 1/0478; B65G 1/0492
See application file for complete search history.

(56) References Cited

U.S. PATENT DOCUMENTS

| | | | |
|---|---|---|---|
| 4,088,232 | A | 5/1978 | Lilly |
| 5,190,427 | A | 3/1993 | Lai |
| 5,595,263 | A | 1/1997 | Pignataro |
| 7,267,518 | B2 | 9/2007 | Kinzer |
| 7,331,471 | B1 | 2/2008 | Shakes et al. |

(Continued)

FOREIGN PATENT DOCUMENTS

| | | |
|---|---|---|
| CA | 2673932 | 7/2008 |
| CA | 2872496 | 10/2013 |

(Continued)

*Primary Examiner* — Jonathan Snelting
(74) *Attorney, Agent, or Firm* — Kyle R Satterwaite; Michael R Williams; Ade & Company Inc.

(57) ABSTRACT

A storage system features a fleet of storage/retrieval vehicles and a gridded three-dimensional structure. The structure features a gridded two-dimensional track layout on which the one or more storage/retrieval vehicles are conveyable in two directions, and a plurality of storage columns residing above or below the gridded track layout in spaced distribution throughout the two-dimensional area of the track layout. Upright shafts reside above or below the gridded track layout and provide vehicle access to the storage columns. At least one working station resides outside the two-dimensional area of the track layout, and via one or more extension tracks, is served by the same vehicles that navigate the gridded structure.

11 Claims, 10 Drawing Sheets

(56) References Cited

U.S. PATENT DOCUMENTS

| | | | |
|---|---|---|---|
| 7,381,022 B1 * | 6/2008 | King | B65G 1/0492 187/270 |
| 7,591,630 B2 | 9/2009 | Lert, Jr. | |
| 7,686,171 B1 | 3/2010 | Shakes et al. | |
| 7,861,844 B2 | 1/2011 | Hayduchok et al. | |
| 7,931,431 B2 * | 4/2011 | Benedict | B65G 1/0478 414/281 |
| 7,963,384 B2 | 6/2011 | Lafontaine | |
| 8,104,601 B2 | 1/2012 | Hayduchok et al. | |
| 8,276,740 B2 | 10/2012 | Hayduchok et al. | |
| 8,622,194 B2 | 1/2014 | DeWitt et al. | |
| 8,628,289 B1 | 1/2014 | Benedict et al. | |
| 8,731,708 B2 | 5/2014 | Shakes et al. | |
| 8,965,560 B2 | 2/2015 | Mathi et al. | |
| 9,010,517 B2 | 4/2015 | Hayduchok et al. | |
| 9,020,632 B2 * | 4/2015 | Naylor | B65G 1/0492 700/218 |
| 8,996,157 B2 | 5/2015 | Collin | |
| 9,122,566 B2 | 9/2015 | Bastian, II et al. | |
| 9,139,363 B2 | 9/2015 | Lert | |
| 9,187,244 B2 | 11/2015 | Toebes et al. | |
| 9,309,056 B2 | 8/2016 | Lafontaine | |
| 9,422,108 B2 | 8/2016 | Hognaland | |
| 9,598,239 B2 | 3/2017 | Lert, Jr. | |
| 9,600,798 B2 | 3/2017 | Battles et al. | |
| 9,682,822 B2 | 6/2017 | Lindbo et al. | |
| 9,687,883 B2 | 6/2017 | Hayduchok et al. | |
| 9,725,242 B2 | 8/2017 | Issing et al. | |
| 9,796,080 B2 | 10/2017 | Lindbo et al. | |
| 9,815,625 B2 | 11/2017 | DeWitt et al. | |
| 9,821,960 B2 | 11/2017 | Issing | |
| 9,884,721 B2 | 2/2018 | Suemitsu et al. | |
| 10,000,338 B2 | 6/2018 | Lert, Jr. | |
| 10,040,632 B2 | 8/2018 | Lert, Jr. | |
| 10,106,323 B2 * | 10/2018 | Terrill | B65G 1/0492 |
| 2003/0228196 A1 | 12/2003 | Satchwell et al. | |
| 2005/0043850 A1 | 2/2005 | Stevens et al. | |
| 2012/0272500 A1 | 11/2012 | Reuteler | |
| 2013/0181586 A1 | 7/2013 | Hognaland | |
| 2015/0071743 A1 | 3/2015 | Lert, Jr. | |
| 2015/0127143 A1 | 5/2015 | Lindbo et al. | |
| 2015/0225187 A1 | 8/2015 | Razumov | |
| 2015/0291357 A1 | 10/2015 | Razumov | |
| 2016/0130086 A1 | 5/2016 | Yamashita | |
| 2016/0140488 A1 | 5/2016 | Lindbo | |
| 2016/0347545 A1 | 12/2016 | Lindbo et al. | |
| 2016/0355337 A1 | 12/2016 | Lert, Jr. et al. | |
| 2017/0129703 A1 | 5/2017 | Lindbo et al. | |
| 2017/0140327 A1 | 5/2017 | Lindbo | |
| 2017/0166400 A1 | 6/2017 | Hofmann | |
| 2017/0313514 A1 | 11/2017 | Lert, Jr. et al. | |
| 2017/0369246 A1 | 12/2017 | DeWitt et al. | |
| 2018/0025460 A1 | 1/2018 | Watanabe et al. | |
| 2018/0037412 A1 | 2/2018 | Lynch et al. | |
| 2018/0134492 A1 | 5/2018 | Lert, Jr. | |
| 2018/0150793 A1 | 5/2018 | Lert, Jr. et al. | |
| 2018/0194556 A1 | 7/2018 | Lert, Jr. et al. | |
| 2018/0215543 A1 | 8/2018 | Lert, Jr. et al. | |
| 2018/0216342 A1 | 8/2018 | Lert, Jr. | |
| 2018/0218469 A1 | 8/2018 | Lert, Jr. et al. | |
| 2018/0247257 A1 | 8/2018 | Lert, Jr. et al. | |
| 2018/0257863 A1 | 9/2018 | Lert, Jr. | |
| 2018/0305123 A1 | 10/2018 | Lert, Jr. et al. | |

FOREIGN PATENT DOCUMENTS

| | | |
|---|---|---|
| CA | 2885984 | 11/2013 |
| CA | 2920361 | 12/2014 |
| CA | 2942445 | 9/2015 |
| CA | 2953028 | 12/2015 |
| DE | 102009017241.6 | 4/2009 |
| EP | 1452462 | 8/2007 |
| EP | 2121204 | 1/2008 |
| FR | 2614609 | 4/1987 |
| GB | 2542651 | 3/2017 |
| GB | 2544649 | 5/2017 |
| GB | 2544650 | 5/2017 |
| JP | 2003341810 | 12/2003 |
| JP | 5562646 | 7/2014 |
| JP | 2015199563 A | 11/2015 |
| JP | 6271509 | 1/2018 |
| KR | 101489337 | 2/2015 |
| WO | 2007068406 | 6/2007 |
| WO | 2013155107 | 10/2013 |
| WO | 2014090684 | 6/2014 |
| WO | 2015019055 | 2/2015 |
| WO | 2015/134529 | 9/2015 |
| WO | 2015197696 | 12/2015 |
| WO | 2016/172793 | 11/2016 |
| WO | 201797724 | 6/2017 |
| WO | 2017108383 | 6/2017 |
| WO | 2017/197121 | 11/2017 |
| WO | 2017197121 | 11/2017 |
| WO | 2017/211640 | 12/2017 |
| WO | 2018/069282 | 4/2018 |
| WO | 201894286 | 5/2018 |
| WO | 2018102444 | 6/2018 |
| WO | 2018132500 | 7/2018 |
| WO | 2018144622 | 8/2018 |
| WO | 2018144625 | 8/2018 |
| WO | 2018144626 | 8/2018 |
| WO | 2018156966 | 8/2018 |
| WO | 2018195200 | 10/2018 |

* cited by examiner

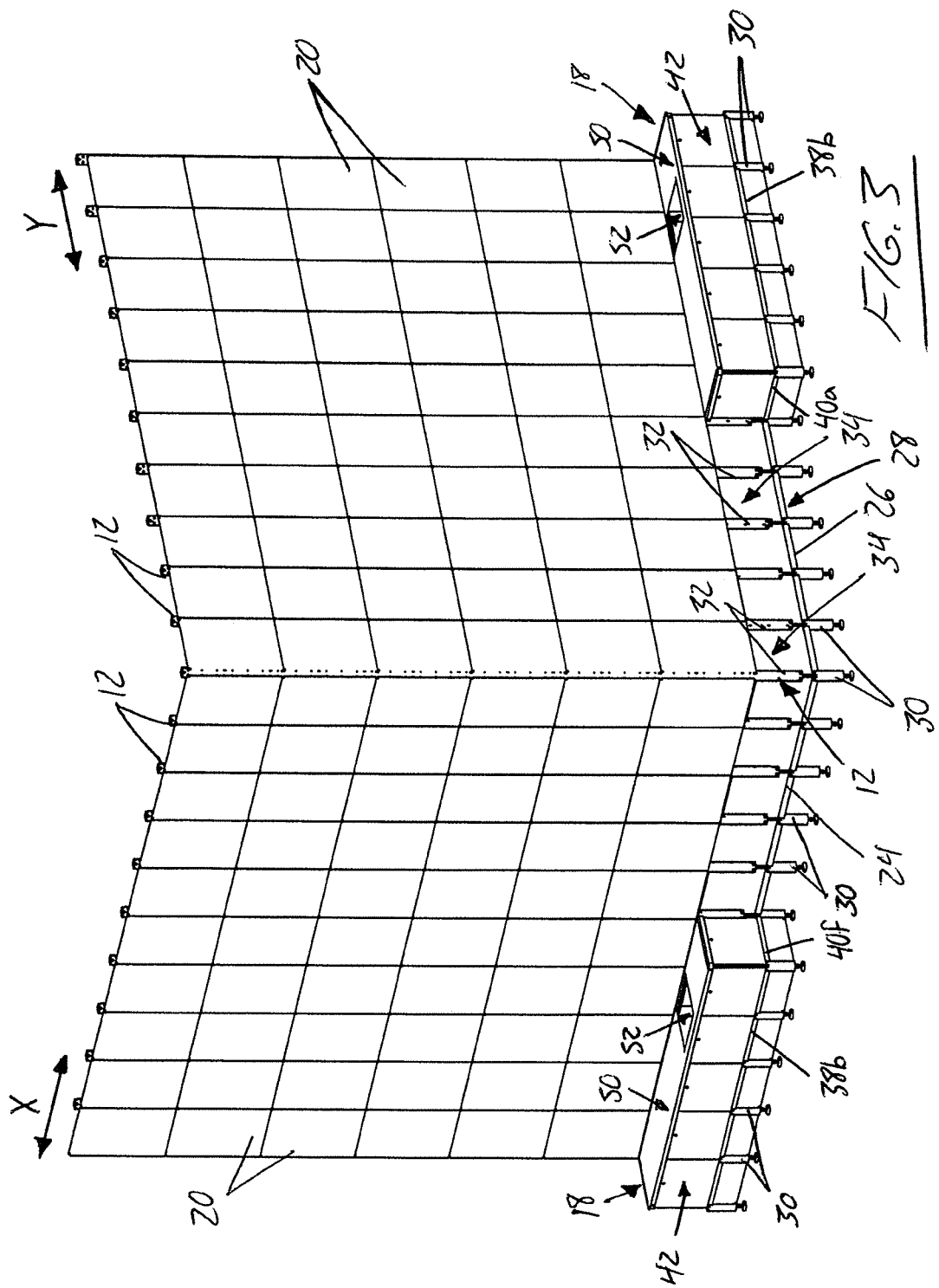

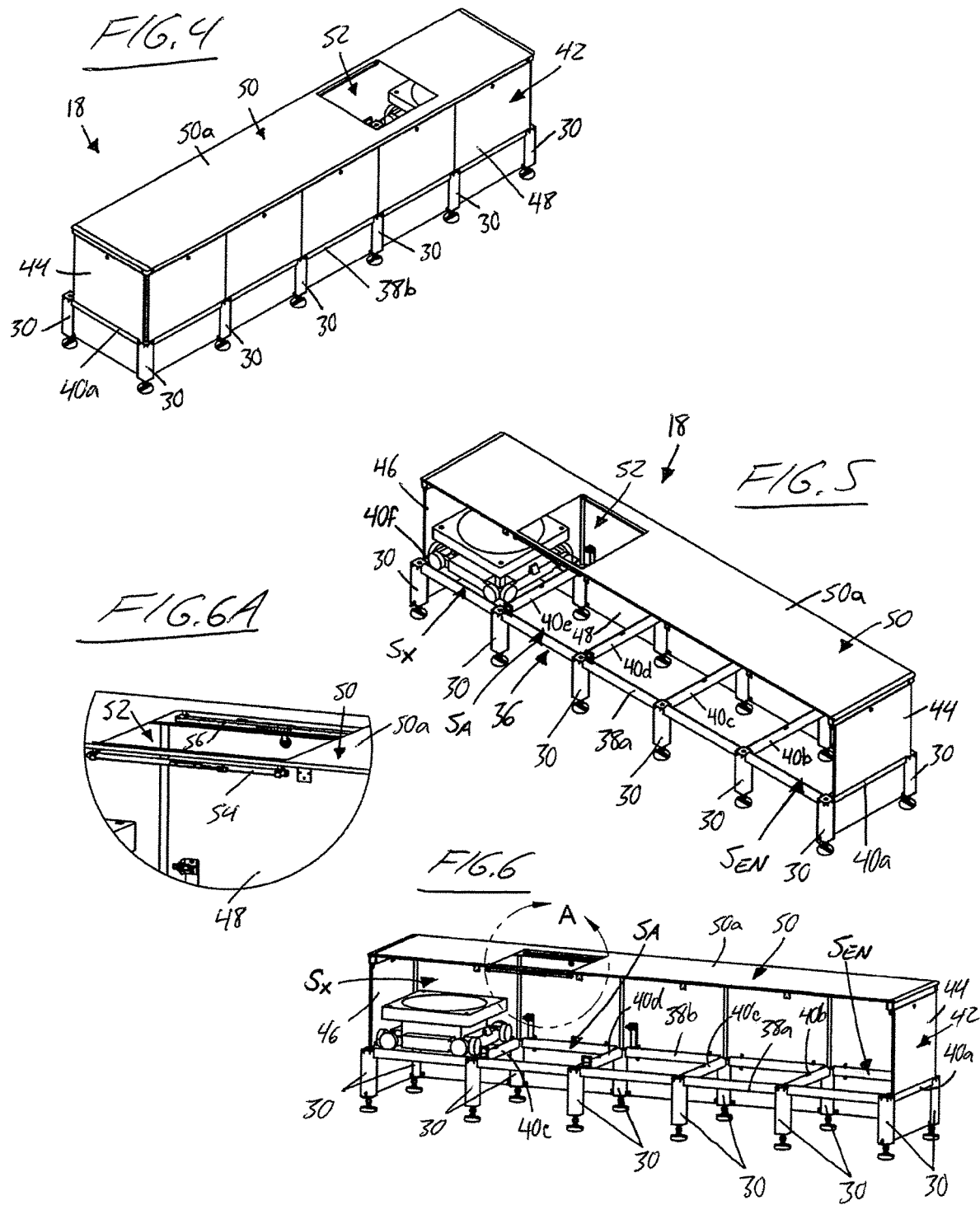

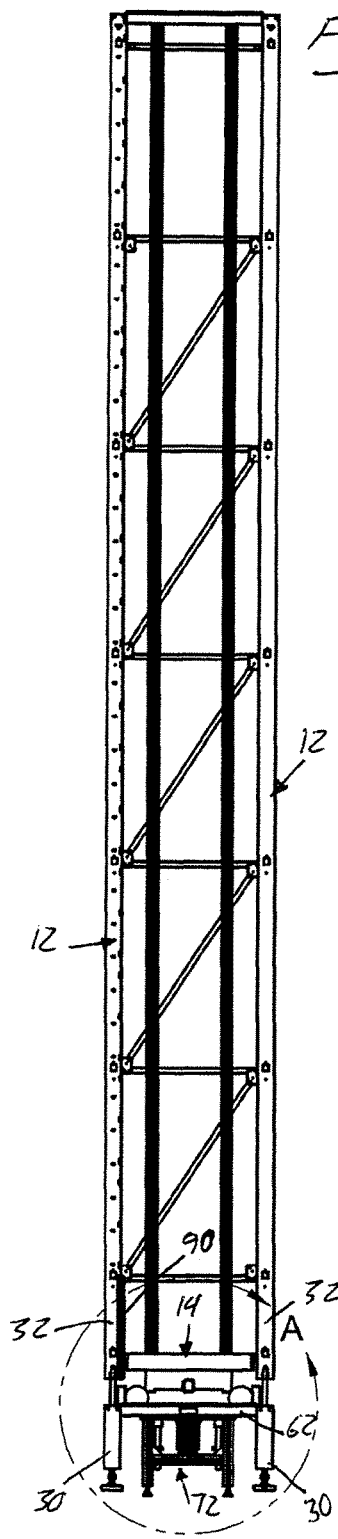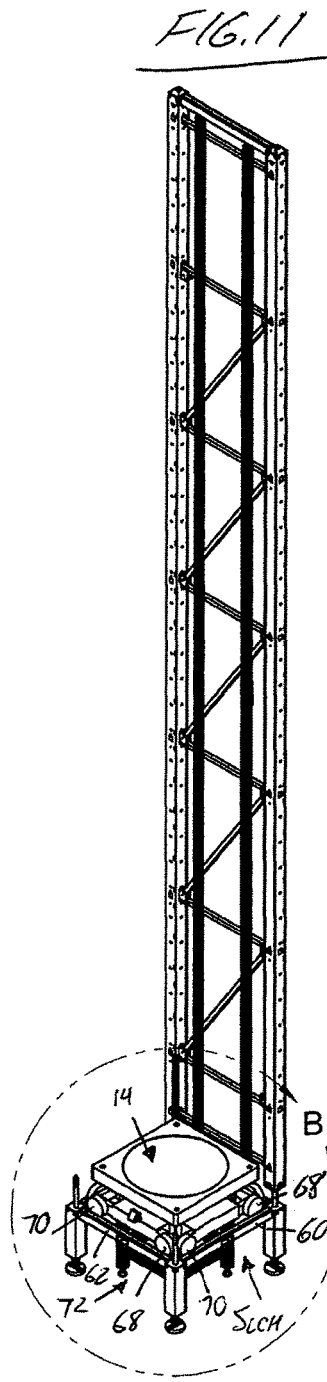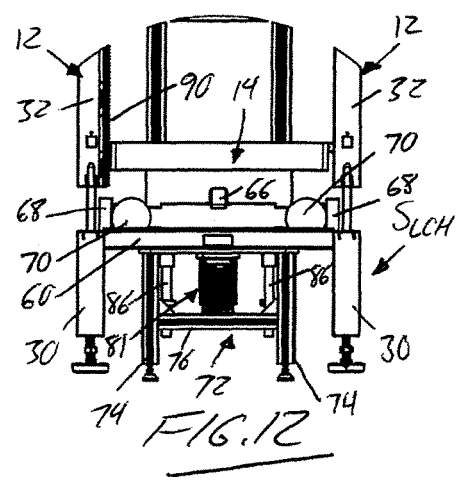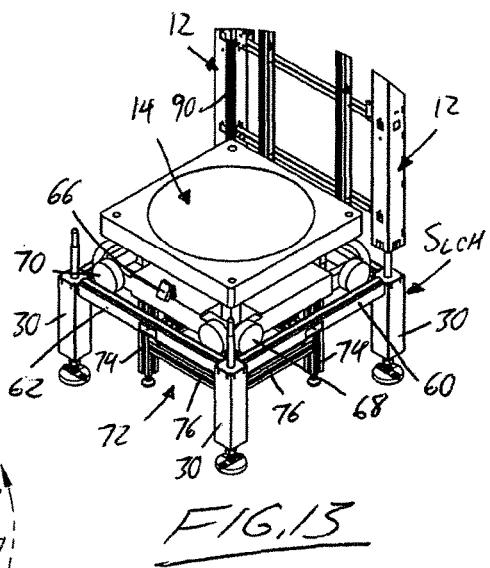
FIG. 10
FIG. 11
FIG. 12
FIG. 13

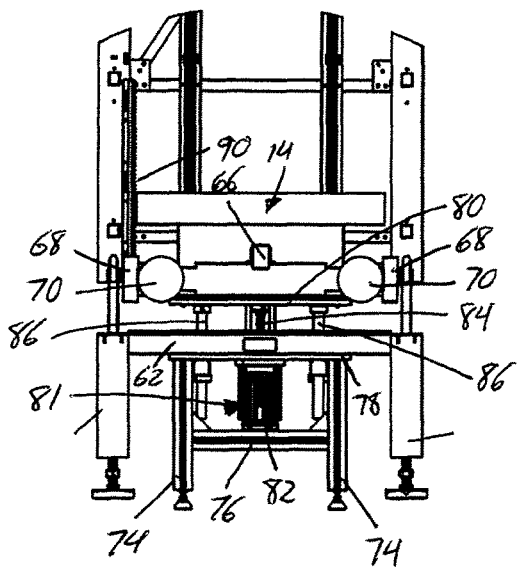
FIG.14
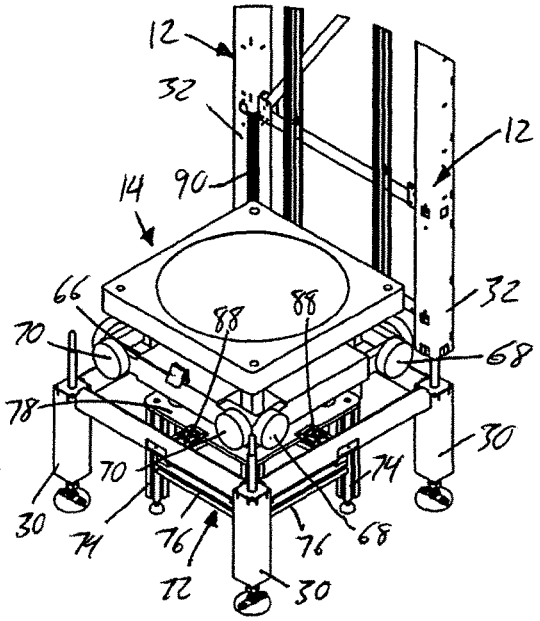
FIG.15
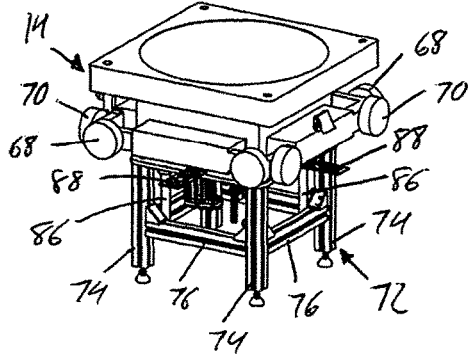
FIG.16
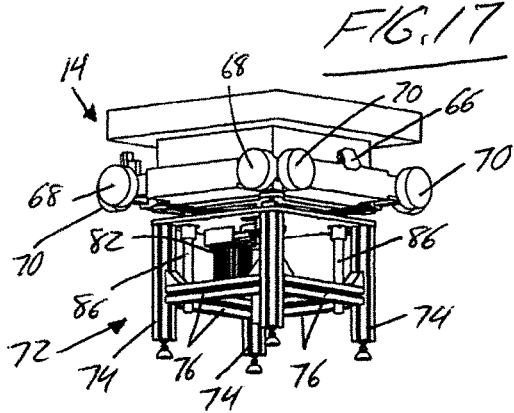
FIG.17
FIG.18
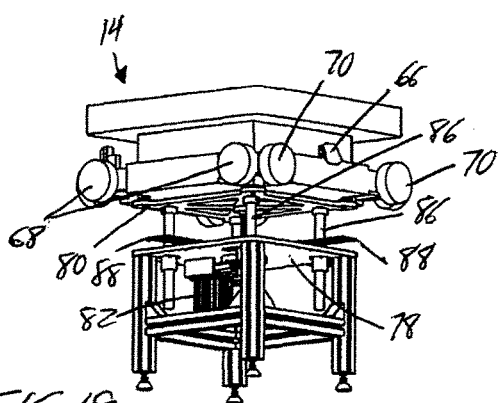
FIG.19

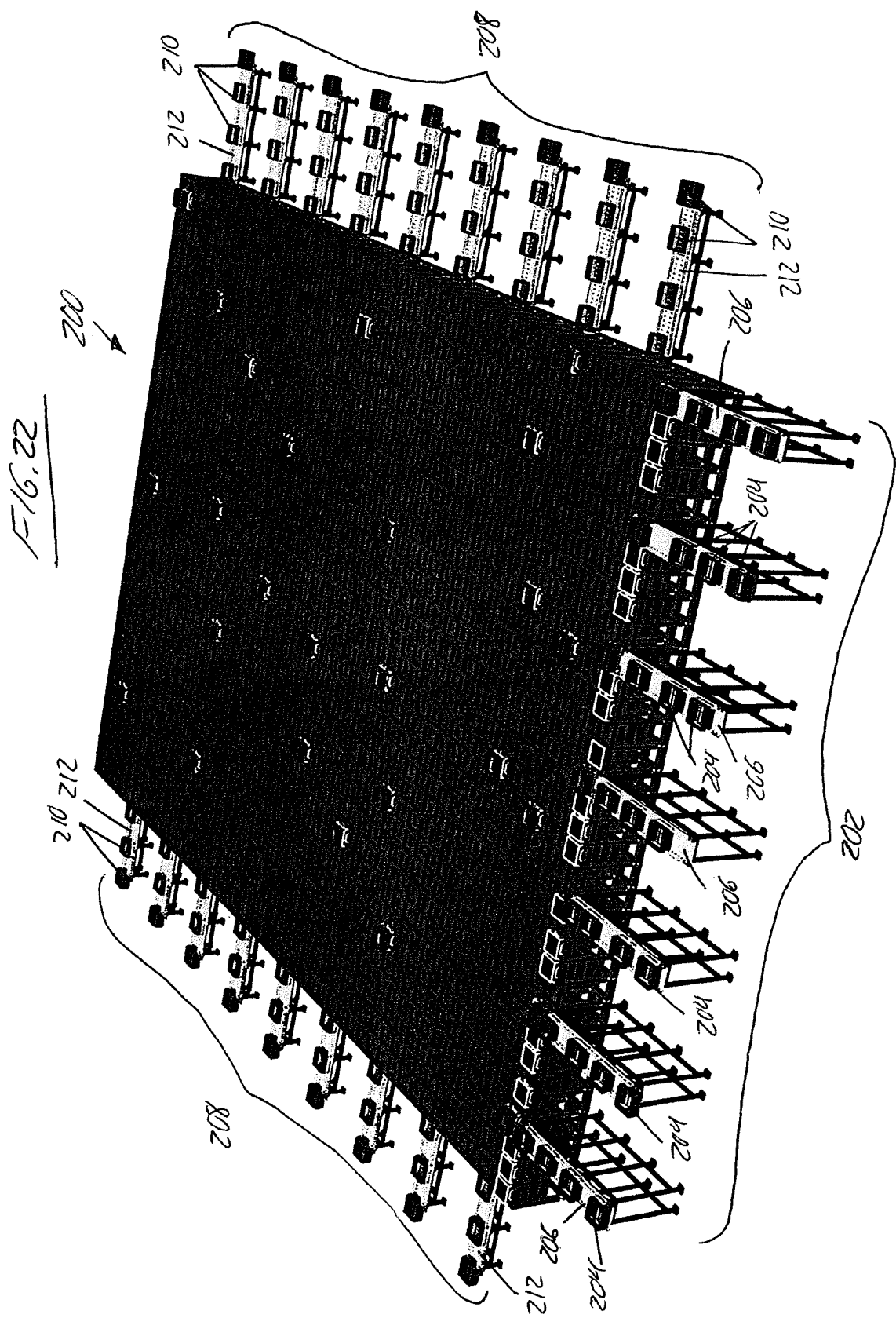

STORAGE AND RETRIEVAL SYSTEMS SHARING A COMMON ROBOTIC FLEET BETWEEN A STORAGE GRID AND EXTERNAL WORKSTATIONS

CROSS-REFERENCE TO RELATED APPLICATIONS

This application claims benefit under 35 U.S.C. 119(e) of U.S. Provisional Patent Application No. 62/682,691, filed Jun. 8, 2018, and U.S. Provisional Patent Application 62/770,788, filed Nov. 22, 2018, each of which is incorporated herein by reference in its entirety.

FIELD OF THE INVENTION

The present invention relates generally to automated storage and retrieval systems useful in order fulfillment environments.

BACKGROUND

Applicant's prior PCT application WO2016/172793, the entirety of which is incorporated herein by reference, disclosed a goods-to-man storage and retrieval system employing a three-dimensional storage grid structure in which a fleet of robotic storage/retrieval vehicles navigate a three-dimensional array of storage locations in which respective bins or other storage units are held. The storage/retrieval vehicles travel horizontally in two dimensions on both a gridded upper track layout disposed above the three-dimensional array of storage locations, and a gridded lower track layout disposed at ground level below the array of storage locations. The same storage/retrieval vehicles also traverse the structure in the third vertical dimension through vertically upright shafts that join together the upper and lower track layouts. Each column of storage locations is neighboured by one of these upright shafts, whereby each and every storage location in the grid is directly accessible by the storage/retrieval vehicles.

Continued development has led to numerous improvements in the system design, and novel applications for same, the details of which will become more apparent from the following disclosure.

SUMMARY OF THE INVENTION

According to a first aspect of the invention, there is provided a storage system comprising:
  a gridded three-dimensional structure comprising:
  a gridded lower track layout that occupies a two-dimensional area and on which one or more storage/retrieval vehicles are conveyable in two directions over said two-dimensional area; and
  a plurality of storage columns residing above the gridded lower track layout in spaced distribution over the two-dimensional area of said lower track layout, each column comprising a plurality of storage locations arranged one over another and sized to accommodate placement and storage of storage units therein; and
  a plurality of upright shafts residing above the gridded lower track layout in spaced distribution over the two dimensional area of said lower track layout, each storage column being neighboured by a respective one of the upright shafts through which the storage locations of said storage column are accessible by the one or more storage/retrieval vehicles to place or remove the storage units to or from said storage locations of said storage column; and
  at least one working station residing alongside the gridded three-dimensional structure and outside the two-dimensional area of the lower track layout over which the storage columns and upright shafts are distributed, said working station being joined to the gridded lower track layout by an extension track thereof by which said one or more storage/retrieval vehicles is conveyable between said working station and said lower track layout, whereby conveyance of the storage units between the storage locations and the working station is performable entirely by said one or more storage/retrieval vehicles.

According to a second aspect of the invention, there is provided a storage system comprising:
  one or more storage/retrieval vehicles;
  a gridded three-dimensional structure comprising:
  a gridded track layout that occupies a two-dimensional area and on which the one or more storage/retrieval vehicles are conveyable in two directions over said two-dimensional area;
  a plurality of storage columns residing above or below the gridded track layout in spaced distribution throughout the two-dimensional area of said track layout, each column comprising a plurality of storage locations arranged one over another and sized to accommodate placement and storage of storage units therein; and
  a plurality of upright shafts residing above or below the gridded track layout in spaced distribution within the two-dimensional area of said track layout, each storage column being neighboured by a respective one of the upright shafts through which the storage locations of said storage column are accessible by the one or more storage/retrieval vehicles to place or remove the storage units to or from said storage locations of said storage column; and
  at least one working station residing outside the two-dimensional area of the track layout within which the storage columns and upright shafts are distributed;
  wherein conveyance of the storage units between the at least one working station and the storage locations in the gridded three-dimensional structure is performed solely by said one or more storage/retrieval vehicles.

According to a third aspect of the invention, there is provided a storage system comprising:
  one or more storage/retrieval vehicles;
  a three-dimensional structure comprising a three-dimensional array of storage locations sized to accommodate placement and storage of storage units therein; and
  at least one working station to which selected storage units from the storage locations are conveyable by said one or more storage/retrieval vehicles;
  wherein each working station comprises an enclosure through which said one or more storage/retrieval vehicles are conveyable, and an access opening in said enclosure through which a carried storage unit on one of the storage/retrieval vehicles is accessible when said vehicle reaches said access opening of the working station.

BRIEF DESCRIPTION OF THE DRAWINGS

Preferred embodiments of the invention will now be described in conjunction with the accompanying drawings in which:

FIG. 3 is a simplified partial perspective view of the three-dimensional grid structure of FIG. 2 showing a pair of intersecting outer walls of the grid structure at a corner thereof from which two working stations have been removed to reveal details of said outer walls.

FIG. 4 is an isolated perspective view of one of the working stations from the three-dimensional grid of FIG. 2 from an outer side thereof that faces outwardly from the grid.

FIG. 5 is an isolated perspective view of the working station of FIG. 4 from an inner side thereof that faces inwardly into the grid.

FIG. 6 is another isolated perspective view of the inner side of the working station of FIG. 5.

FIG. 6A is a partial closeup view of the portion of FIG. 6 marked by detail circle A thereof.

FIG. 10 is an elevational view showing one of the robotic storage/retrieval vehicles on the lower track of the three-dimensional grid at launching spot below a vertical shaft of the three-dimensional grid through which the robotic storage/retrieval vehicle is intended to travel upwardly.

FIG. 11 is a perspective view of the robot of FIG. 10 at the launching spot of the lower track.

FIG. 12 is a partial closeup view of the portion of FIG. 10 marked by detail circle A thereof.

FIG. 13 is a partial closeup view of the portion of FIG. 11 marked by detail circle B thereof.

FIG. 14 is another closeup of the same robotic storage/retrieval vehicle and lower track intersection point as FIG. 12, but with the robotic storage/retrieval vehicle raised up to engage with rack teeth on upright frame members of the shaft by a lifting mechanism mounted beneath the lower track.

FIG. 15 another closeup of the same robotic storage/retrieval vehicle and lower track intersection point as FIG. 13, but with the robotic storage/retrieval vehicle in the raised position of FIG. 14.

FIGS. 16 and 17 are top and bottom perspective views of the robotic storage/retrieval vehicle and lifting mechanism of FIGS. 10 to 13, but shown in isolation from the lower track and upright shaft members.

FIGS. 18 and 19 are top and bottom perspective views of the robotic storage/retrieval vehicle and lifting mechanism of FIGS. 14 and 15, but shown in isolation from the lower track and upright shaft members.

FIG. 22 illustrates a sortation/buffering grid employing the same three-dimensional grid structure and robotic storage/retrieval vehicles as the storage systems of FIGS. 1 and 2, but with a different layout of stations serving the grid for use in management of pre-packed shipping containers.

DETAILED DESCRIPTION

Figure 1:
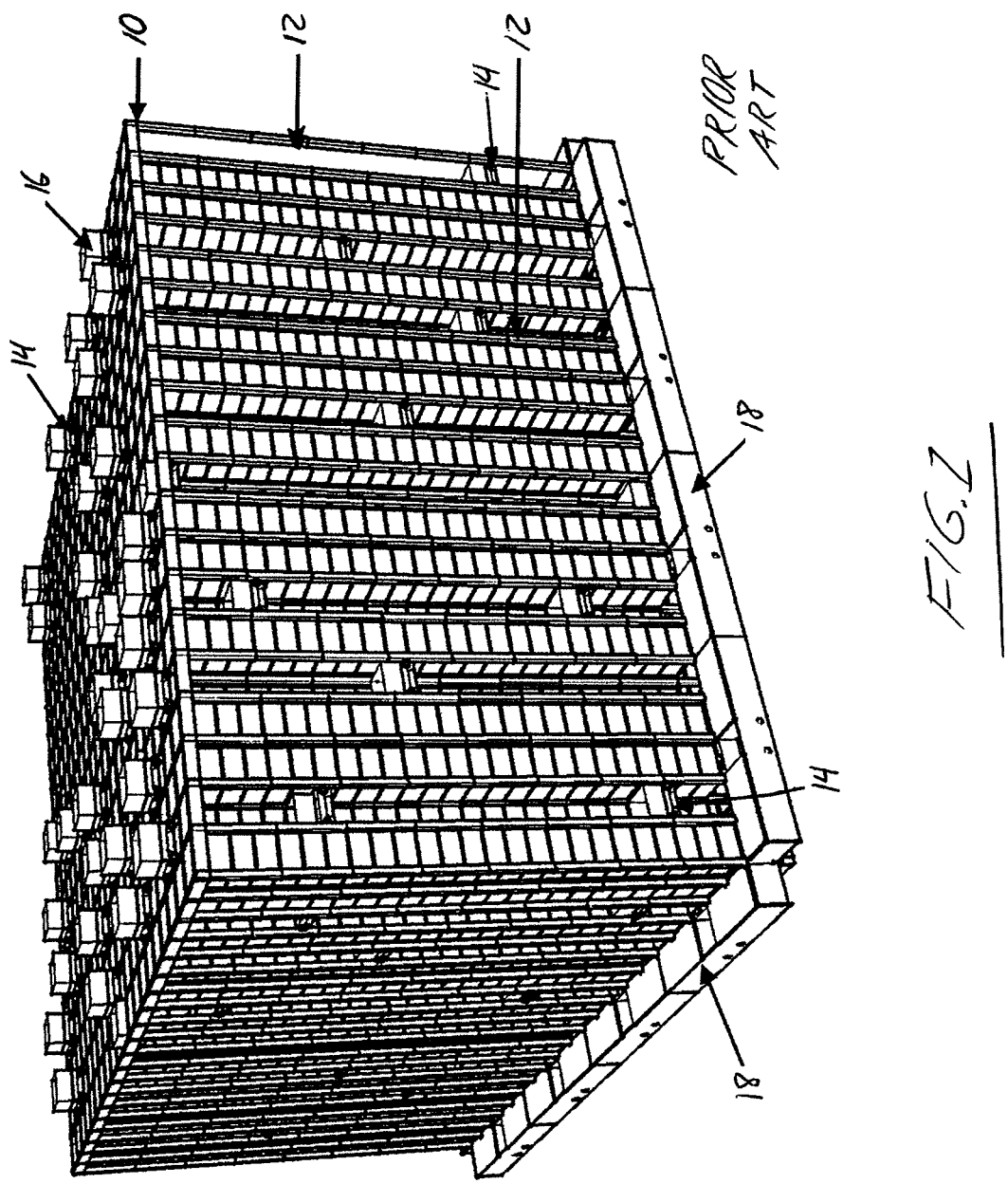
FIG. 1 is a perspective view of a three-dimensional grid structure from Applicant's aforementioned prior PCT application, in which a three-dimensional array of storage units are contained and through which a fleet of robotic storage/retrieval vehicles can travel in three dimensions to access each said storage units.

FIG. 1 illustrates the three-dimensional grid structure from Applicant's aforementioned prior PCT application. A gridded upper track layout 10 resides in an elevated horizontal plane well above a matching gridded lower track layout situated in a lower horizontal plane close to ground level. Between these upper and lower track layouts is a three-dimensional array of storage locations, each holding a respective storage unit therein, for example in the form of open-top or openable/closeable storage tray, bin or tote capable of holding any variety of goods therein. The storage locations are arranged in vertical columns, in which storage locations of equal footprint are aligned over one another. Each such storage column is neighboured by a vertical shaft through which its storage locations are accessible.

Each track layout features a set of X-direction rails lying in the X-direction of a horizontal plane and a set of Y-direction rails perpendicularly crossing the X-direction rails in the Y-direction of the horizontal plane. The crossing rails define a horizontal reference grid of the storage system, where each horizontal grid row is delimited between an adjacent pair of the X-direction rails and each horizontal grid column is delimited between an adjacent pair of the Y-direction rails. Each intersection point between one of the horizontal grid columns and one of the horizontal grid rows denotes the position of a respective storage column or a respective upright shaft. In other words, each storage column and each shaft resides at a respective Cartesian coordinate point of the reference grid at a respective area bound between two of the X-direction rails and two of the Y-direction rails. Each such area bound between four rails in either track layout is also referred to herein as a respective "spot" of said track layout. The three-dimensional addressing of each storage location and associated storage unit in the system is completed by the given vertical level at which the given storage location resides within the respective column. That is, a three-dimensional address of each storage location is dictated by the horizontal grid row, horizontal grid column and vertical column level of the storage location in the three-dimensional grid.

A respective upright frame member 12 spans vertically between the upper and lower track layouts at each intersection point between the X-direction and Y-direction rails, thereby cooperating with the track rails to define a framework of the three-dimensional grid structure for containing and organizing the three-dimensional array of storage units within this framework. As a result, each upright shaft of the three-dimensional storage array has four vertical frame members spanning the full height of the shaft at the four corners thereof. Each frame member has respective sets of rack teeth arranged in series in the vertical Z-direction of the three-dimensional grid on two sides of the frame member. Each shaft thus has eight sets of rack teeth in total, with two sets at each corner of the shaft, which cooperate with eight pinion wheels on the robotic storage/retrieval vehicles to enable traversal of same between the upper and lower track layouts through the shafts of the three-dimensional grid structure. Each robotic storage/retrieval vehicle 14 has both round conveyance wheels for conveyance of the robotic storage/retrieval vehicle over the upper and lower track layouts in a track-riding mode, and toothed pinion wheels for traversal of the robotic storage/retrieval vehicle through the rack-equipped shafts in a shaft-traversing mode. Each pinion wheel and a respective conveyance wheel are part of a combined singular wheel unit, extendable in an outboard direction from the vehicle for use of the conveyance wheels in a track-riding mode on either track layout, and retractable in an inboard direction of the vehicle for use of the pinion wheels in a shaft-traversing mode engaging the pinion wheels with the rack teeth of the upright frame members of a shaft.

The framework of the grid structure includes a respective shelf at each storage location to support the respective storage unit, whereby any given storage unit 16 can be removed from its storage location by one of the robotic retrieval vehicles without disrupting the storage units above and below it in the same storage column. Likewise, this allows a storage unit to be returned to a prescribed location at any level in the array. The lower gridded track layout at the bottom of the three-dimensional grid has a number of working stations 18 distributed around its perimeter to which the robotic retrieval vehicles 14 deliver the storage units pulled from the storage columns. Except for differences explicitly described herein, the framework of the three-dimensional grid structure, the robotic storage/retrieval vehicles, their travel over the upper and lower track layouts and through the shafts, and their transition between the track-riding and shaft-traversing modes are the same as described in Applicant's aforementioned prior PCT application.

Figure 2:
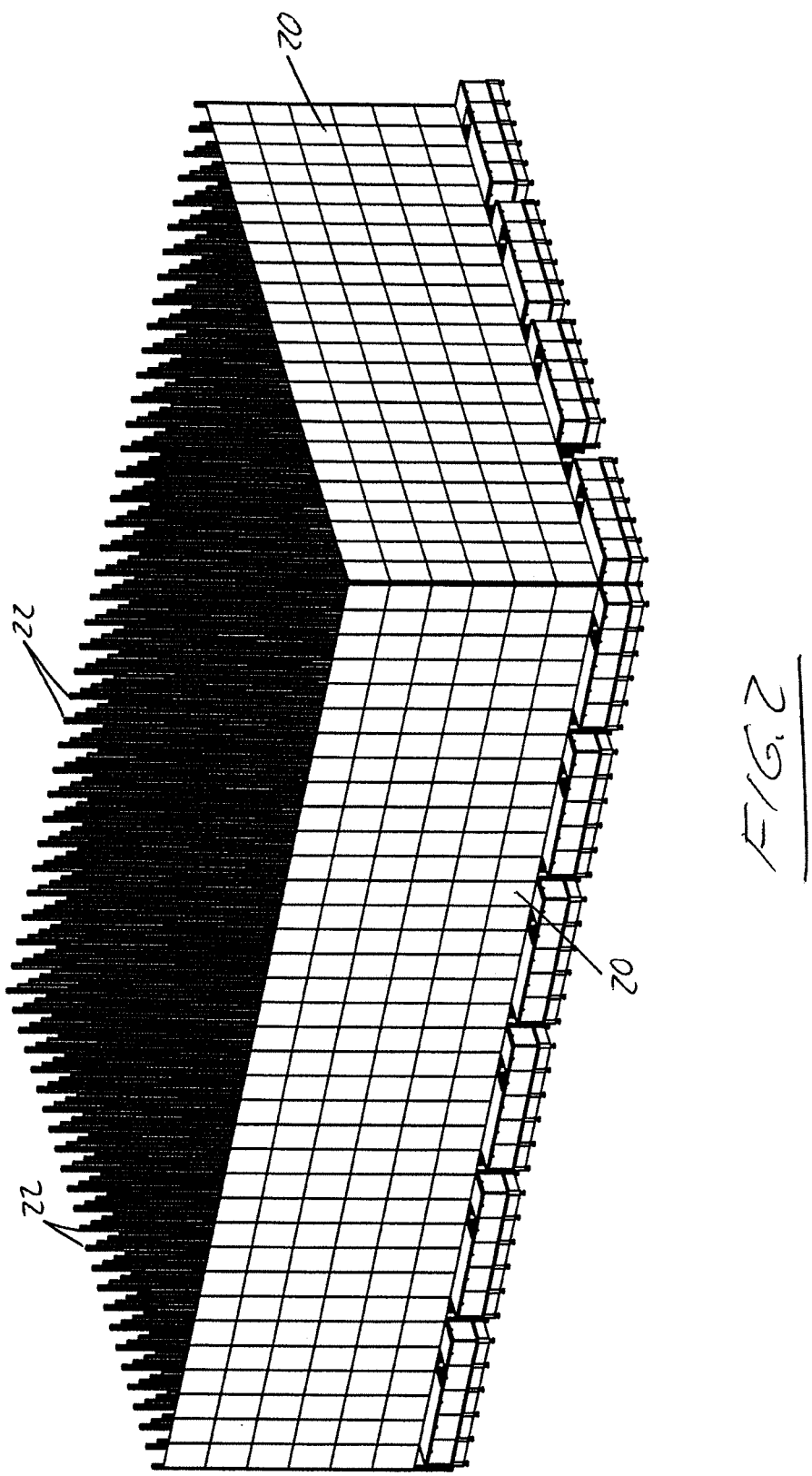
FIG. 2 is a perspective view of a modified three-dimensional grid structure according to the present invention.

FIG. 2 shows a modified form the prior three-dimensional grid structure, which once again features the upper and lower track layouts and the upright frame members that span therebetween to carry shelving at the storage locations for support of the storage units therein, and also carry the rack teeth engagable by the pinion wheels of the robotic storage/retrieval vehicles to enable vertical travel of thereof through the shafts. The shelving may be in the form of flanged panels or rails at the three sides of the storage column other than the fourth shaft-adjacent side that opens into the neighbouring access shaft from which the robotic storage/retrieval vehicles access the storage units of that column, whereby this fourth open side enables insertion and withdrawal of the retractable turret arm of each vehicle into the storage column at to pull and push storage units into and out of the storage column through engagement with the undersides of the storage units.

As outlined in in Applicant's aforementioned prior PCT application, a subset of the vertical shafts located at the outer perimeter may be "up-shafts" that are dedicated for upward travel of the robotic storage vehicles therethrough from the lower track layout to the upper track layout after having delivered a storage unit to one of the working stations 18, while other vertical shafts are "down-shafts" that are dedicated for downward travel of the robotic storage vehicles therethrough from the upper track layout during either retrieval of a storage unit from the three dimensional storage array, or return of a storage unit back into the three dimensional array after having previously delivered the storage unit to one of the working stations 18 for a picking, re-stocking or other operation.

The three-dimensional grid structure of FIG. 2 differs from that of FIG. 1 in that cladding panels 20 have been added to the upright frame members at the outer perimeter of the grid structure to create outer side walls that substantially close off all four sides of the grid structure, thus visually concealing the interior thereof, and in that the upright frame members 12 include top segments 22 thereof that stand upright frame the rails of the upper track members at the intersection points thereof, and that obscure the upper track from sight in the particular wide-view of the grid structure shown in FIG. 2. These top segments of the shaft may be used for mounting of charging station hardware by which the robotic storage/retrieval vehicles can be recharged when necessary. However, the structure and purpose of the upper track layout and the form of shafts and storage columns inside the grid structure by the upright frame members are well documented in Applicant's prior PCT application, and thus require no detailed illustration or explanation herein.

Turning now to FIGS. 3 to 6, attention is given to the novel structure of the working stations 18 and the novel interaction therewith by the robotic storage/retrieval vehicles. In the interest of illustrative simplification, FIG. 3 omits much of the grid structure. Shown however are one X-direction rail 24 and one Y-direction rail 26 of the lower track layout 28 that form two outer sides of the lower track layout and intersect at a respective outer corner of the grid structure. Of the remainder of the lower track layout, only the support legs 30 elevating these two particular rails off the ground are shown. Among the upright frame members 12 of the grid structure, only those that stand upright from two illustrated rails 24, 26 at these two outer sides of the grid structure are shown, and the top segments 22 of these upright frame members 12 are omitted. Around the full perimeter of the grid structure, the cladding panels 20 do not extend fully down to the lower track 28, but instead terminate in a slightly elevated relation thereover so that bottom segments 32 of the upright frame members that attach to and stand upright from the rails of the lower track layout are left uncladded. This leaves an open space 34 between the bottom segments 32 of every adjacent pair of upright frame members 12. These open spaces 34 allow the robotic storage/retrieval vehicles 14 to enter and exit the three-dimensional grid structure at the lower track 28 thereof, and thus transition between the three-dimensional grid structure and the working stations 18.

As outlined in more detail below, this enables a novel solution for goods-to-man order fulfilment, where a robotic storage/retrieval vehicle capable of travel in three dimensions provides the sole means of storage unit conveyance throughout an entire order picking operation, from the initial retrieval of the storage unit from anywhere in the three dimensional space of the grid, through delivery of the storage unit to the working station, including presentation of the storage unit to a human or robot picker at the working station, and subsequent return of the storage unit back into any three dimensional location in the grid, without the storage unit ever being offloaded from the robotic storage/retrieval vehicle and conveyed by a separate conveyor, turntable or other transitional mechanism.

FIGS. 4 through 6 illustrate one of the working stations 18 in isolation from the three-dimensional storage grid. Each working station 18 features a gridded lower track 36 featuring a pair of longitudinal rails 38a, 38b running a length of the working station 18. The lower track also features a set of cross rails 40a-40f perpendicularly interconnecting the longitudinal rails 38 with one another at regularly spaced internals therealong. These rails are of the same type used in the gridded upper and lower track layouts of the three-dimensional grid structure, and the spacing between the longitudinal rails matches the spacing between the cross rails and is equal to the inter-rail spacing employed between the rails of the upper and lower track layouts of the grid structure in both the X and Y directions thereof. Accordingly, the lower track of the working station can be traversed by the robotic storage/retrieval vehicles in the same manner as the upper and lower track layouts of the three-dimensional grid. The lower track of the working station is supported in slightly elevated relation above ground level by support legs 30 depending downward from the lower track at the intersection points of the longitudinal rails and cross rails. These support legs 30 are of the same type and height as those that support the lower track layout of the three-dimensional grid, whereby the lower track 36 of the working station resides at the same elevation as the lower track layout of three-dimensional grid structure to form a coplanar extension track extending therefrom.

The working station features a chute 42 mounted to the lower track and spanning longitudinally end-to-end thereof from a first one of the cross-rails 40a at a first end of the longitudinal rails to a last one of the cross-rails 40f at a second opposing end of the longitudinal rails. The chute features a first end wall 44 standing upright from the first cross-rail, a second end wall 46 standing upright from the last cross-rail in opposing and parallel relation to the first end wall, a longer outer side wall 48 spanning longitudinally between the end walls in perpendicular relation thereto at an outer one 38b of the longitudinal rails, and a top cover panel 50 spanning longitudinally between the end walls and along the top edge of the outer side wall. An underside of the cover panel 50 defines an interior ceiling of the chute 42, while an opposing topside of the cover panel defines an external countertop 50a for exploit by human or robotic workers during picking, restocking or other work functions that may be performed at the working station 18.

Each square area delimited between the two longitudinal rails 38a, 38b and any adjacent pair of the cross rails 40a-40f is referred to as a respective "spot" along the lower track of the working station. The spot located immediately adjacent the first end wall 44 of the chute 42 and bound between the first and second cross rails 40a, 40b at the first end of the chute is referred to as an entrance spot $S_{EN}$ of the working station, as it is here that a robotic storage/retrieval vehicle enters the chute by riding onto these first and second cross rails 40a, 40b from a respective pair of rails aligned therewith in the lower track layout of the grid structure. At the opposing second end of the chute, the spot located immediately adjacent the second end wall 46 between the second-last and last cross rails 40e, 40f is referred to as an exit spot $S_X$, as it is here that the robotic storage/retrieval vehicle exits the chute and re-enters the three-dimensional grid by riding off these last and second-last cross-rails onto another respective pair of rails aligned therewith in the lower track layout of the grid structure.

Referring to FIG. 3, the working station on the right side of the figure has its longitudinal direction running in the Y-direction of the grid structure's lower track layout, such that this working station has its longitudinal rails 38a, 38b lying in the Y-direction and its cross rails 40a-40f lying the X-direction. The first and second cross-rails 40a, 40b of the working station's lower track form parallel, in-line extensions of a first pair of X-direction rails of the grid structure's lower track layout, and the last and second last 40e, 40f cross rails likewise form parallel, in-line extensions of a second pair of X-direction rails of the grid structure' lower track layout. Accordingly, a robotic storage/retrieval vehicle can ride along a pair of X-direction rails of the lower track layout through the uncladded open space 34 between the two upright frame members at the ends of these rails at the outer side of the grid structure at which the working station resides, and onto the first and second cross rails 40a, 40b at the entrance spot $S_{EN}$ of the working station. At this entrance spot, the robotic storage/retrieval vehicle transitions from an X-direction travel mode into a Y-direction travel mode, and can then travel along the working station's longitudinal rails 38a, 38b in the Y-direction to the exit spot $S_X$ of the working station. Here, the robotic storage/retrieval vehicle then transitions back into its X-direction travel mode to ride atop the last and second last cross rails of the working station back onto the second pair of X-direction rails of the lower track layout of the grid structure through the uncladded open space 34 between the upright frame members at the ends of these rails.

The working station on the left side of FIG. 3 has its longitudinal direction running in the X-direction of the grid structure's lower track layout, such that this working station has its longitudinal rails 38a, 38b lying in the X-direction and its cross rails 40a-40f lying the Y-direction. The first and second cross-rails 40a, 40b of the working station's lower track form parallel, in-line extensions of a first pair of Y-direction rails of the grid structure's lower track layout, and the last and second last 40e, 40f cross rails likewise form parallel, in-line extensions of a second pair of Y-direction rails of the grid structure's lower track layout. Accordingly, a robotic storage/retrieval vehicle can ride along a pair of Y-direction rails of the lower track layout through the uncladded open space 34 between the two upright frame members 12 standing upright from the ends of these rails at the outer side of the grid structure at which the working station resides, and onto the first and second cross rails 40a, 40b at the entrance spot $S_{EN}$ of the working station. At this entrance spot, the robotic storage/retrieval vehicle transitions from the Y-direction travel mode into the X-direction travel mode, and can then travel along the working station's longitudinal rails 38a, 38b in the X-direction to the exit spot $S_X$ of the working station. Here, the robotic storage/retrieval vehicle then transitions back into its Y-direction travel mode to ride atop the last and second last cross rails of the working station back onto the lower track layout of the grid structure on the second pair of X-direction rails through the uncladded open space 34 between the upright frame members at the ends of these rails.

Between the second cross rail 40b and second last cross rail 40e of each working station are a plurality of intermediate spots between the entrance and exit spots. The illustrated example features three intermediate spots, but this number may vary. One of these intermediate spots, particularly the second last spot immediately neighbouring the exit spot $S_X$ in the illustrated example, is designated as an "access spot" $S_A$ at which the robotic storage/retrieval vehicle is accessible by the human or robotic worker via an access opening 52 penetrating through the top panel 50 of the chute from the countertop surface 50a thereof into the interior space of the chute. Accordingly, when the storage/retrieval vehicle travelling longitudinally through the chute arrives and stops at the access spot $S_A$, the worker can interact with a storage unit carried atop said storage/retrieval vehicle, for example to pick one or more individual items from the storage unit as part of an order fulfilment process withdrawing such items from the grid structure, to instead remove the entire storage unit from the storage/retrieval vehicle as part of such an order fulfillment process, or to instead place one or more individual items into the storage unit as part of a restocking process replenishing the grid structure. Alternatively, a restocking process may involve directing an empty one of the robotic storage/retrieval vehicles (i.e. a vehicle currently unoccupied by a storage unit) to the access spot of the working station to pick up a storage unit from the worker through the access opening 52.

The working station 18 is equipped with a hand-sensing mechanism to protect human workers from potential injury as they interact with the storage/retrieval vehicle through the access opening 52. With reference to FIG. 6A, first and second sensor bars 54, 56 are affixed to the underside of cover panel 50 of the working station in positions lying along opposing perimeter edges of the access opening. The sensor bars carry optical beam emitters and receivers in opposing relation to one another on the two bars 54, 56 so that beams emitted by the emitters are received by the opposing receivers unless the beam is interrupted, for example by insertion of a workers hand(s) into the access opening 52. As opposed to emitters and receivers on opposing sides of the access opening, the sensor configuration may employ emitters and receivers on the same side of the opening, and reflectors on the opposing side thereof. The sensor bars communicate, through wired or wireless connection, with a computerized control system that wirelessly communicates with the fleet of robotic storage/retrieval vehicles to control conveyance thereof throughout the grid structure to perform various tasks (picking, restocking, etc.). Continuity of the hand sensor beams generates a "safe" signal, whereas interruption of the sensor beams generates a "stop" signal. Transmission by the computerized control system to a storage/retrieval vehicle of any movement instruction that commands said storage/retrieval vehicle to move into or out of the access spot of a working station is conditional on detection of a "safe" signal from the hand sensing mechanism of that working station. This way, no robotic storage/retrieval vehicle is ever driven along the lower track of the working station while a worker's hand is inside the chute.

In addition to serving a safety purpose, the hand sensing mechanism may also be operable for quality assurance purposes helping ensure human working accuracy in their picking tasks. For a given order for which a predetermined quantity of items is known to be required from a given storage unit, the computerized control system can count the number of times the optical beams are broken while that storage unit is present at the access spot, thus representing a count of how many times the workers hands were inserted through the access opening to access the storage unit an pull a respective item therefrom. The system compares the hand-insertion count against the predetermined quantity of items known to be required from that storage unit, and only permits the storage/retrieval vehicle on which that storage unit is carried to depart the access spot of the working station once the hand-insertion count has reached the predetermined item quantity associated with that storage unit.

The hand sensing mechanism also serves as a height-check on the storage unit to ensure that not items therein are protruding notably upward from the top of the storage unit, as such protruding items will break the light curtain formed by the optical beams, and thus prevent departure of the storage/retrieval vehicle and the storage unit thereon from the access spot until the protrusion is rectified. This helps ensure that the storage/retrieval vehicle will not attempt to re-enter the storage grid with one or more items protruding from the storage unit and interfering with the available travel spaces between the framework components of the grid structure.

While FIGS. 4 through 6 show the inner longitudinal rail 38a as part of the isolated working station, it will be appreciated that this rail is shared with the lower track layout of the grid structure when the working station is installed at the grid structure. With reference to FIG. 3, the inner longitudinal rail 38a of the working station on the right side of the figure is an in-line section of the Y-direction perimeter rail 26 at the respective side of the grid structure's lower track layout 28. The outer rail of that working station lies parallel to the Y-direction perimeter rail of the grid structure's lower track layout, and the cross-rails of the working station connect the Y-direction perimeter rail 26 of the lower track layout to the outer longitudinal rail 38b of the working station at positions in-line with and joined to the X-direction rails of the lower track layout. Likewise, the inner longitudinal rail 38a of the working station on the left side of the figure is an in-line section of the X-direction perimeter rail 24 at the respective side of the grid structure's lower track layout. The outer rail 38b of that working station lies parallel to the X-direction perimeter rail of the grid structure's lower track layout, and the cross-rails of the working station connect the X-direction perimeter rail of the lower track layout to the outer longitudinal rail 38b of the working station at positions in-line with and joined to the Y-direction rails of the lower track layout.

The lower track of each working station is thus an extension track connected to the lower track layout of the three-dimensional grid structure in a position running alongside the lower track layout to allow seamless transition of the robotic storage/retrieval vehicles between the three-dimensional grid and the working station situated outside the two-dimensional footprint occupied by the upper and lower track layouts and the columns and shafts spanning therebetween. The transition of the vehicles between the lower track layout of the three-dimensional grid and the working station takes place via the working station entrance $S_{EN}$ situated at one end of the working station's lower track and the working station exit $S_X$ situated at an opposing second end of the working station's lower track. By way of the computerized control system, the robotic storage/retrieval vehicles are driven through the working stations in a unidirectional manner from the dedicated entrance to the dedicated exit, which allows multiple vehicles to be queued inside the working station, thus reducing traffic obstruction on the lower track layout of the three-dimensional grid. In the illustrated example, the use of separate entrance and exit spots and inclusion of one or more intermediate spots in each working station between the entrance and exit spots thereof increases this internal queueing capacity of each working station.

However, the use of separate entrance and exit spots, inclusion of one or more intermediate spots between the entrance and exit, and placement of the access opening at a dedicated spot other than the entrance or exit spots are optional features, and may be omitted altogether or in various combinations. For example, in one alternative embodiment, the lower track of the working station may be as simple as two cross-rails extending from the lower track layout to define a single spot over which the access opening 52 resides, thus serving as an entrance, exit and access point of the working station all at one singular track spot. The robotic storage/retrieval vehicle would ride forwardly onto this single-spot extension track in the X or Y direction perpendicular to the perimeter rail at the side of the lower track layout, receive interaction with the worker through the access opening, and then exit the working station in a reverse direction back onto the lower track layout of the three-dimensional grid. Accordingly, the extension track need not necessarily be elongated along the perimeter of the lower track layout of the grid structure like in the illustrated embodiment, and the enclosure need not necessarily be an elongated chute having spaced apart entrance and exit points at longitudinally spaced locations of the working station's lower track.

Figure 7:
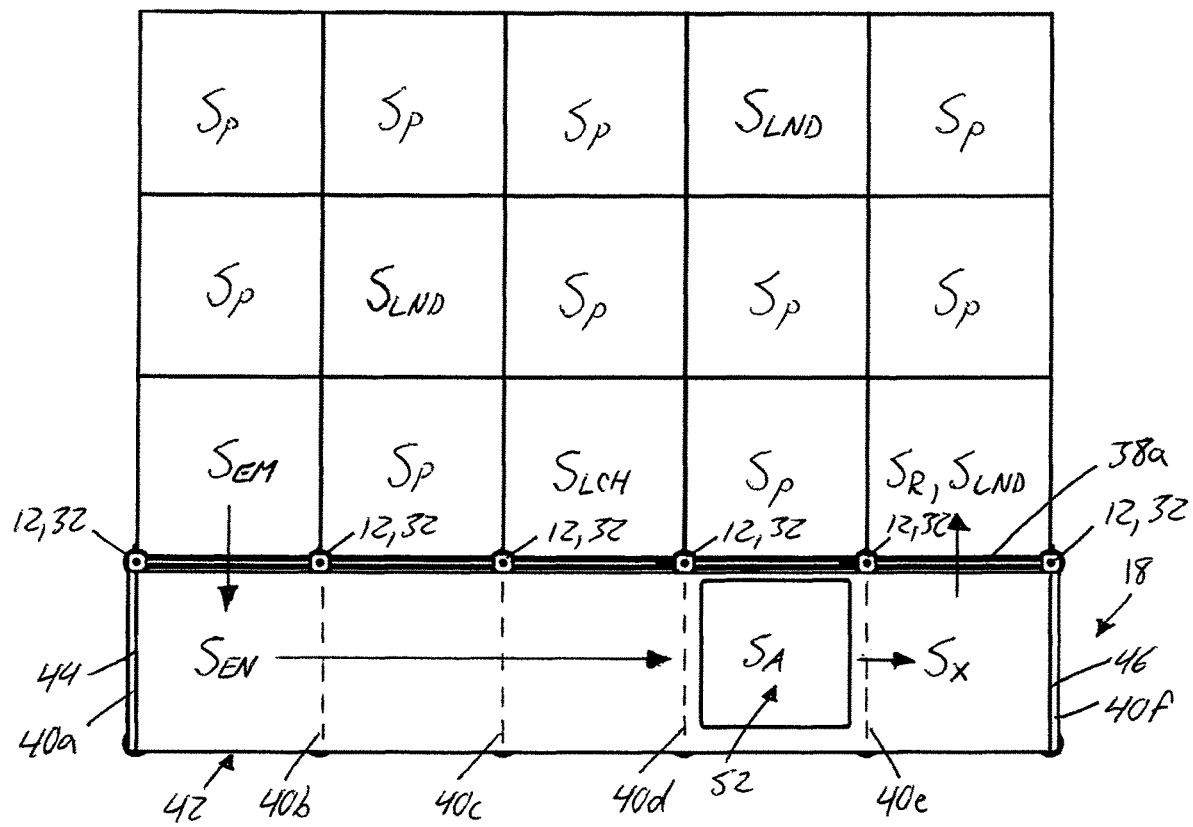
FIG. 7 is a schematic overhead plan view of the working station of FIGS. 4 to 6 and a neighbouring area of a lower track layout of the three-dimensional grid structure at which the working station is installed.

FIG. 7 schematically shows an overhead plan view of one of the working stations, and a neighbouring area of the lower track layout of the three-dimensional grid. As with the working station lower track, the square area denoted between two adjacent X-direction rails and two adjacent Y-direction rails of the lower track layout is referred to as a respective "spot" therein. Each spot underlying a respective down-shaft of the three-dimensional grid is designated as a landing spot $S_{LND}$ at which the robotic storage/retrieval vehicles land on the lower track layout after having travelled vertically downward through the down-shaft. Each spot underlying a respective up-shaft at the outer perimeter the three-dimensional grid is designated as a launching spot $S_{LCH}$ from which the robotic storage/retrieval vehicles travel upwardly through the up-shaft to the upper track layout. The spot in the lower grid that neighbours the entrance spot $S_{EN}$ of the working station 18 is referred to as an emergence spot $S_{EM}$ from which the robotic travel vehicle exits the lower track layout of the three-dimensional grid and enters the working station 18 at the entrance spot thereof. The spot in the lower grid that neighbours the exit spot $S_X$ of the working station 18 is referred to as a re-entry spot $S_R$ from which the robotic travel vehicle re-enters the three-dimensional grid from the exit spot $S_X$ of the working station. Arrows in the figure show the travel path followed by a robotic storage/retrieval vehicle, first travelling outward from the emergence spot of the lower track layout into the entrance spot of the working station, then travelling longitudinally through the access spot for interaction with the worker, before moving longitudinally into the exit spot and then transitioning back into the lower track layout at the re-entry spot thereof.

One or both of the departure and re-entry spots may be a multi-purpose spot, for example also serving as a landing or launching spot under a respective down-shaft or up-shaft, as shown in the illustrated example where the re-entry spot is also a landing spot. All other spots in the area of the lower track layout neighbouring the working station underlie respective storage columns of the grid in which the storage units are shelved. These spot serve as available parking spots $S_P$ in which a robotic storage/retrieval vehicle carrying a respective storage unit can be selectively parked after landing on the lower track layout at the landing spot $S_{LND}$ at the bottom of the down-shaft from which the robotic storage/retrieval vehicle retrieved said storage unit in the event that there's another robotic storage/retrieval vehicle that is destined for the same working station and whose travel to said working station has been assigned a greater priority ranking than the robotic storage/retrieval vehicle being parked. Selection by the computerized control system of a particular spot at which to park one of the storage/retrieval vehicles may be based on an available least-distance travel path to the working station entrance from a particular one of the designated landing spots at which the parking storage/retrieval vehicle arrived at the gridded lower track layout.

Accordingly, the computerized control system responsible for assigning tasks to the robotic storage/retrieval vehicles and controlling navigation thereof through the three-dimensional grid and working stations can orchestrate arrival of a group of occupied vehicles (i.e. vehicles carrying respective storage units thereon) to the assigned working station for which those storage units are destined in a sequence that doesn't necessarily match the sequence in which the tasks were assigned (i.e. the assignment sequence), the sequence in which those storage units were retrieved (i.e. the retrieval sequence) from their respective storage locations, the sequence in which the occupied vehicles landed at the lower track layout (i.e. the landing sequence), or the sequence in which the occupied vehicles initially arrived into a vicinity of the emergence spot adjacent the assigned working station (i.e. the arrival or approach sequence).

In one illustrative example, a picking operation is executed by the computerized control system, and involves assigning a first group of one or more vehicles to retrieve one or more respective storage units each containing a different item for a first customer order and deliver said storage units to a particular working station, and a second group of one or more vehicles assigned to retrieve one or more storage units each containing a different item for a second customer order for delivery to the same working station. Due to differences in travel distance from the initial location of each vehicle to the assigned working station via an available retrieval location at which a storage unit containing the appropriate item is stored (of which there may be multiple options, in which case priority may be given based on shortest overall travel path from the robotic storage/retrieval vehicle's current location to the assigned working destination via the different retrieval location options), vehicles from the two groups may arrive at the lower track with their retrieved storage units and approach the assigned working station in a mixed order. Here, the computerized control system can assign priority rankings on which to sequence the entry of the two groups of vehicles into the working station, and instruct lower priority vehicles to park themselves at currently unoccupied parking spots of the lower track layout.

The assigned priority ranking may be based at least partly on a "grouped delivery" basis so that all items for one order are delivered prior to any item for the other order. Further weighting may be based on a "first landing" or "first arrival" basis, where the first vehicle landing at the lower track layout or approaching the assigned working station dictates which of the two vehicle groups is prioritized over the other in the "grouped delivery" sequence, or on an "order priority" basis where the orders are ranked by priority due to size (i.e. picking larger orders before smaller ones), shipment destination (picking orders destined for more remote destination before more local destinations), delivery deadlines, customer types, shipment vehicle availability, etc. So, depending on the ranking criteria selected, all items of the first order may be delivered to the access spot of the working station before any item of the second order, or vice versa, regardless of the particular sequence in which the two orders were received by the system. Alternatively, a large order requiring a high number of storage units for complete fulfillment may have its queue of robotic storage/vehicles interrupted by one or more robotic storage/retrieval vehicles assigned to a small order in order to pick the entire small order at the working station before returning to continued picking of the larger order.

By using the very same grid structure in which the storage units are arrayed and by which the robotic vehicles navigate the storage array, this internally performed sequence orchestration enables complex sequencing or sortation during order picking operations while avoiding the space and material inefficiencies associated with prior art techniques, such as space intensive sortation conveyors, where the retrieval step is performed by one fleet of machines, and then sortation is performed downstream at a second stage of different machinery or equipment type, before delivering sorted items to assigned working stations situated remotely of the storage structure.

While the forgoing example specifically uses dedicated up-shafts, dedicated down-shafts, and designated parking spots specifically on the lower track layout for the purpose of selectively parking vehicles after storage unit retrieval on their way to assigned lower level working stations without interfering with flow of other unparked vehicles moving through the three dimensional grid, it will be appreciated that other locales in the three dimensional grid may be used to temporarily park retrieved storage units during the orchestration of sequenced delivery to the working stations. Accordingly, any of the square spots between the X and Y direction rails of the upper track layout may likewise be used as a temporary parking spot for occupied vehicles during delivery sequence orchestration, just as they may be used to park inactive vehicles awaiting activation by way of operational assignment and instruction from the computerized control system. In such instance, the spots overlying the up-shafts and down-shafts are preferably reserved as drop-down spots for entry to the down-shafts and climb-out spots for exit from the up-shafts, and thus not employed for temporary parking purposes so as not to hinder traffic flow of unparked vehicles through the grid. Likewise, the sequenced delivery orchestration may employ parking of vehicles at any level in the down-shafts and/or up-shafts for the purpose of delaying the arrival of such parked vehicles to the working stations in view of higher priority rankings assigned to the other occupied vehicles, though again, it may be preferable to avoid such obstruction to shaft travel by other vehicles. While select embodiments have specific up-shafts dedicated to only upward traffic flow of the robotic storage/retrieval vehicles and separate down-shafts dedicated to only downward traffic flow, it will be appreciated that other embodiments need not restrict each shaft to a particular direction of traffic flow. Accordingly, the spot on the lower track layout beneath such a two-way shaft would serve as both a launching spot and landing spot, and the spot on the upper track layout above the two-way shaft would serve as both a drop-down and climb-out spot for that shaft.

While the forgoing examples focus on picking operations used to fulfill an order by delivering storage units containing items for that order to a working station where a human or robotic worker can remove such items from the storage units and compile them into a shipping container for delivery to a customer, the working stations can also be used for re-stocking or order buffering operations, where items are placed into the storage unit presented by the robotic storage/retrieval vehicle at the access spot of the working station, from which the robotic storage/retrieval vehicle then re-enters the grid to place that storage unit in an available storage location in the three-dimensional grid. In the re-stocking operation, the items placed in the robotic storage/retrieval vehicle-carried storage unit are new inventory items of a type not previously stored in the structure, or inventory replenishment items replacing previously picked items.

An order buffering operation first involves a picking operation, in which the computerized control system assigns and instructs a group of storage/retrieval vehicles to retrieve different storage units containing a particular collection of items required to fulfill an order, and to carry the retrieved items in their respective storage units down to the gridded lower track layout and onward to the entrance of the working station assigned to this buffering operation. As the assigned group of vehicles move through the working station, the worker extracts one or more items of the order from the storage unit on each vehicle when said vehicle arrives at the access spot of the working station, and these extracted items are amalgamated together in order to form a full or partial fulfillment of the order.

This fully or partially fulfilled order is placed into a container of compatible size with the storage spaces in the three-dimensional grid structure. This container may the same as the rest of the storage units, for example an openable/closeable storage bin, or may be a shipment container of different type from the storage units (e.g. cardboard shipping box, optionally sealed closed and having a shipping label already placed thereon, for example if the amalgamated order contents fulfill the entire order). The computerized controller sends an unloaded vehicle to the same working station, where the container with the amalgamated order contents is placed atop this vehicle at the access spot of the working station. The computerized controller then sends this order-carrying vehicle back into the three-dimensional grid structure with instructions to store the fully or partially fulfilled order in an available storage location in the three-dimensional grid structure. The same three-dimensional storage grid used to store inventory items can therefore also be used to buffer partially prepared or fully-ready shipments until a later date or time, for example a future pickup time at which a shipping vehicle is expected to arrive to pick up a fully completed order for delivery, or in the case of a partially fulfilled order requiring additional items currently not in stock, a future time at which the out of stock inventory will be replenished to enable completion of the order.

When it comes time for the pickup or inventory replenishment, a buffered-order retrieval operation is performed by the computerized control system, sending a robotic storage/retrieval vehicle to retrieve the order container from its storage location, and deliver the order container to one of the working stations, for retrieval of the container, or the individual items contained therein, through the access opening of the working station. If the buffered order was only a partial order, then the previously missing items are then amalgamated with the retrieved items, either by addition to the same container if useable as a shipment container, or by amalgamation into a new shipping container.

Having summarized the novel working stations of the present invention, novel uses thereof, and novel use of the three-dimensional grid structure itself for workstation delivery sequencing and order buffering, attention is now turned to other points of novelty in the three-dimensional grid structure, robotic vehicle fleet and cooperative operation therebetween.

Figure 8:
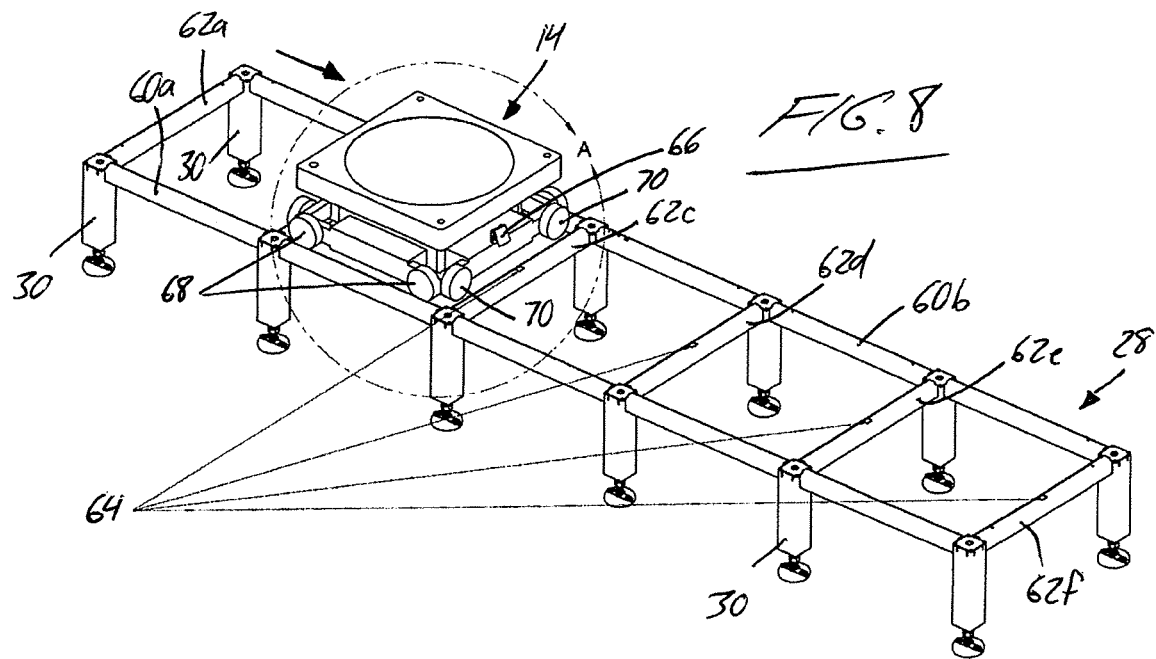
FIG. 8 shows a segment of a lower track of the three-dimensional grid of FIG. 2, along which one of the robotic storage/retrieval vehicles is travelling.
Figure 9:
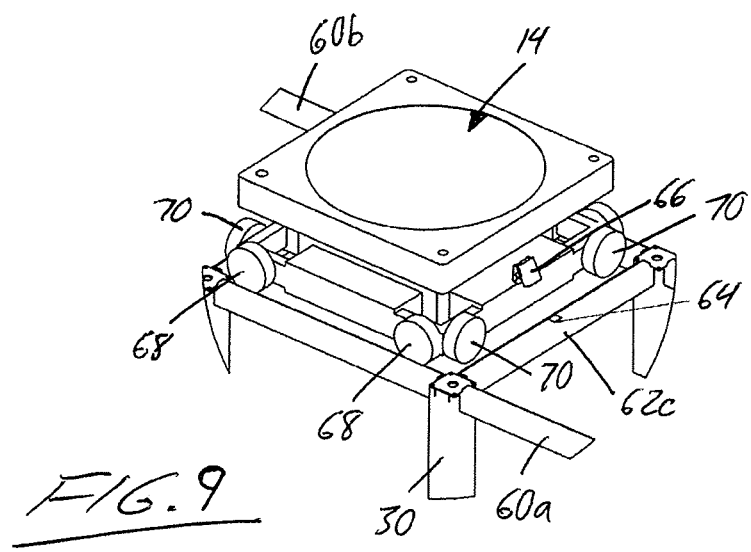
FIG. 9 is a partial closeup view of the portion of FIG. 8 marked by detail circle A thereof.

FIG. 8 illustrates an isolated section of the lower track layout of the three-dimensional grid structure, with parallel first and second longitudinal rails 60*a*, 60*b* running in the X-direction of the lower track layout, and a parallel set of additional cross-rails 62*a*-62*f* perpendicularly interconnecting the first and second longitudinal rails 60*a*, 60*b* at regularly spaced intervals therealong in the Y-direction of the lower track layout. As mentioned above, a respective spot of the lower track layout is denoted by the square area between the two longitudinal rails and each adjacent pair of cross-rails 62*a*-62*f*. The cross-rail on the same side of each spot (on the right side of each spot in the illustrated example) carries a visually detectable location marker 66 thereon at a mid-point of the cross-rail's topside. The detectable location marker may be applied as a separate sticker or label, or etched into the rail of the track itself. Each robotic storage/retrieval vehicle carries a scanner 66 on a side of the robotic storage/retrieval vehicle that matches the side of the track spots on which the location markers 64 are positioned. The scanner comprises an image capture device with a downwardly angled field of view oriented to capture imagery of the marked cross-rails as the robotic storage/retrieval vehicle travels the lower track layout. The field of view is aimed so that the frame size thereof at the marked topsides of the rails exceeds the size of the detectable markers. The scanner and the location markers are positioned relative to one another such that when the robotic storage/retrieval vehicle is properly centered between the two longitudinal rails and two cross-rails bounding a given spot of the lower track, the respective location marker 66 on one of the cross-rails will occupy a predetermined subregion of the scanner's field of view (e.g. a central area thereof). As the robotic storage/retrieval vehicle arrives at a targeted destination spot of the lower track layout, the scanner captures images from its current field of view and a software module executed by a local computer processor of the robotic vehicle compares the position of the location marker within the larger viewing frame of the scanner to check fore agreement between the marker position in the viewing frame and expected viewing frame sub-region in which the marker is expected. So where the sub-region is a central area of the viewing frame, the software is checking whether the marker is properly centered in the viewing frame. The relative agreement or disagreement thus reflects the relative alignment between the robotic storage/retrieval vehicle and the targeted spot on the lower track layout.

As described in Applicant's aforementioned prior PCT application, the robotic storage/retrieval vehicle 14 features a set of X-direction wheels 68 on two opposing sides of the robotic storage/retrieval vehicle, and a set of Y-direction wheels 70 on the other two opposing sides of the robotic storage/retrieval vehicle. The X-direction wheels 68 are raiseable and lowerable relative to a frame or chassis of the robotic storage/retrieval vehicle into an out of engagement with the X-direction rails of the track layout, just as the Y-direction wheels 70 are raiseable and lowerable relative to a frame of the robotic storage/retrieval vehicle into an out of engagement with the Y-direction rails of the track layout. Raising of the X-direction wheels out of contact with the X-direction rails is performed when the robotic storage/retrieval vehicle is to travel in the Y direction by driven rotation of the Y-direction wheels on the Y-direction rails, while raising of the Y-direction wheels out of contact with the Y-direction rails is performed when the robotic storage/retrieval vehicle is to travel in the X direction by driven rotation of the X-direction wheels on the X-direction rails.

FIG. 8 shows the example where the robotic storage/retrieval vehicle 14 is riding in the X-direction of the lower track layout toward a targeted destination spot thereon, and is scanning the location markers on the Y-direction rails as it does so. Each location marker may embody a scannable code containing a unique ID of the respective spot it designates within the two-dimensional grid map of the lower track layout, whereby this unique ID together with detected alignment of the location marker of the targeted destination spot can be used to both confirm arrival of the robotic storage/retrieval vehicle at the correct targeted destination spot, and achieve proper centering of the robotic storage/retrieval vehicle on this spot. Such alignment ensures that 1) the robotic storage/retrieval vehicle doesn't interfere with travel of other vehicle's travelling in the other direction through neighbouring spots in the track layout; and 2) the robotic storage/retrieval vehicle is properly aligned with the vertical shaft above it if the targeted destination spot is a launching spot from which the robotic storage/retrieval vehicle is intended to travel upwardly through the shaft above it.

The engagement of wheels on opposing sides of the robotic storage/retrieval vehicle with the corresponding rails of the lower track layout automatically ensures alignment of the robotic storage/retrieval vehicle on the targeted spot of the lower track layout in the track direction perpendicular to these rails. So in the illustrated example of FIG. 8, the X-direction wheels are engaged with the X-direction rails, thus automatically aligning the robotic storage/retrieval vehicle with the targeted spot in the Y-direction. During arrival of the robotic storage/retrieval vehicle at the targeted spot in the X-direction, the scanner captures imagery from its viewing frame and the software executed by the local processor on the robotic storage/retrieval vehicle checks the position of the location marker image within the viewing frame, and uses any deviation between the actual and expected location marker position in the viewing frame as feedback signals to dynamically adjust the drive signals to the motors of the X-direction wheels so as to drive the robotic storage/retrieval vehicle into properly centered alignment on the targeted spot. The same alignment procedure is used to provide feedback-governed control over the Y-direction wheels when travelling into a targeted spot in the Y-direction. Since the robotic storage/retrieval vehicles never change orientation on the track layout, the particular selection of which set of rails the markers are placed on (either X-direction or Y direction rails) is of no consequence, provided that the scanner is placed on the appropriately cooperative side of each vehicle.

In addition to such adjustment of the vehicle position as it arrives at the targeted spot on the track layout, earlier dynamic adjustment of the vehicle's travel may take place upstream of such arrival by scanning the other markers past which the vehicle is travelling on its way to the targeted spot beneath the targeted shaft. The original travel instructions assigned and transmitted to the storage/retrieval vehicle by the computerized control system are based on actual physical distance to the targeted shaft based on the known grid dimensions of the structure. Where the vehicle is travelling through more than one pass-through spot to reach the targeted grid spot below the targeted shaft, the scanner can perform a scan as it moves through each pass-through spot use the results to dynamically correct the travel instructions on the fly to account for differences between the originally assigned travel distance and the true-remaining travel distance from the vehicle's current location to the targeted spot, thus co-ordinating more precisely aligned arrival of the storage/retrieval vehicle at the targeted spot to avoid or reduce the need for fine-tuning of the alignment during final arrival at the targeted spot.

While the illustrated embodiment employs static location markers located in the gridded three-dimensional structure at fixed positions relative to the targetable spots on the lower track layout, and moving scanners carried on the travelling storage/retrieval vehicles, this arrangement may be reversed by having statically positioned scanners in the grid structure and detectable markers on the robotic storage/retrieval vehicles, though having the scanning and associated image processing carried out on the robotic storage/retrieval vehicle whose wheels are being controlled is likely preferable. While the forgoing description of the scanner/marker alignment confirmation tool is made with reference to the lower track layout to ensure that a vehicle is properly aligned at a targeted launching spot of the lower track layout before the robotic storage/retrieval vehicle is lifted up into the shaft above such launching spot, the same tool may also be employed on the upper track layout to ensure alignment of a vehicle at a targeted drop-down spot overtop of a respective shaft before lowering of the robotic storage/retrieval vehicle down into said shaft.

FIGS. 10 through 15 illustrate one of the robotic storage/retrieval vehicles at a launching spot $S_{LCH}$ of the lower track layout of the three-dimensional grid structure. A majority of the grid is omitted for illustrative purpose, leaving only the four rails of the lower track layout that delimit this particular launching spot (of which one X-direction rail is labelled 60, and one Y-direction rail is labelled 62), the four support legs 30 supporting the rails at the intersection points therebetween at the corners of the launching spot, and two of the four upright frame members 12 that stand upright from the four corners of the launching spot to define the four corners of the respective vertical up-shaft above the launching spot. The other two upright frame members are omitted to provide improved visibility of the robotic storage/retrieval vehicle to demonstrate interaction thereof with a novel lifting mechanism 72 for raising the storage/retrieval vehicle up into the overlying up-shaft.

The lifting mechanism 72 is seated atop the same ground surface as the support legs 30 of the lower track layout within the rectangular footprint of the launching spot. Shown in isolation from the lower track layout in FIGS. 16 through 19, the lifting mechanism 72 features a base frame having four vertically upright corner legs 74 interconnected by horizontal cross-braces 76, and an upper panel 78 mounted atop the base frame at the top ends of the corner legs 74. A lifting platform 80 resides above the upper panel 78 of the base frame, and is movably carried thereon in a raiseable/lowerable manner by a suitable actuator, which in the illustrated example is an electric linear actuator 81 whose electric motor 82 is mounted to the underside of the base frame's upper panel with the output rod 84 of the actuator reaching upwardly through a central opening in the upper panel to connect to the underside of the lifting platform. Accordingly, extension of the linear actuator raises the lifting platform upwardly from the upper panel, and retraction of the linear actuator lowers the lifting platform back down into contact or close adjacency to the upper panel of the base frame. A set of four linear guide rods 86 are affixed to the underside of the lifting platform near the corners thereof, and pass down through a set of bushings or bearings in the upper plate of the base frame for sliding movement upwardly and downwardly through the upper plate during extension and retraction of the linear actuator. The rod guides thus help stabilize the lifting platform to maintain a horizontally level orientation thereof.

The base frame is of a lesser height than the lower track layout so that the upper panel 78 of the base frame resides at an elevation below the topsides of the rails of the lower track layout, and for example slightly below the undersides of these rails so that when the lifting platform is in the lowered position adjacent the upper panel of the base frame, it doesn't protrude above the rails of the lower track layout. In the lowered position of the lifting platform, the robotic storage/retrieval vehicles can thus travel freely over the launching spot in either track direction. Mounting brackets 88 reach outward from the upper panel of the base frame of the lifting mechanism at two or more sides thereof and are fastened to the rails of the lower track layout, for example at the undersides thereof, thus fixing the position of the lifting platform in a properly squared relation to the gridded track layout and in properly centered position within the square area of the launching spot.

The lifting mechanism is communicable with the computerized control system via wired or wireless connection thereto. When a robotic storage/retrieval vehicle travelling along the lower track layout reaches a targeted launching spot under an up-shaft through which the robotic storage/retrieval vehicle is destined to travel, and is accurately aligned with the up-shaft using the above described location markers and cooperating scanners, the wireless transceiver of the robotic storage/retrieval vehicle responsible for communication thereof with the computerized control system signals said system of the confirmed arrival of the robotic storage/retrieval vehicle at the targeted launching spot. In response to this, the computerized control systems sends an activation signal to the lifting mechanism, in response to which the actuator 80 thereof is activated in the extension direction to raise the lifting platform 80 up into contact with an underside of the robotic storage/retrieval vehicle's frame or chassis just above the rails of the lower track layout. With the weight of the robotic storage/retrieval vehicle now borne by the lifting mechanism rather than by riding of the robotic storage/retrieval vehicle's conveyance wheels on the rails of the lower track layout, the conveyance wheels of the robotic storage/retrieval vehicle are drawn inwardly in an inboard direction to reduce the robotic storage/retrieval vehicle footprint to a reduced size capable of entering the shaft so that the pinion wheels can engage with the rack teeth on the upright frame members at the corners of the up-shaft to enable climbing of the storage/retrieval vehicle therethrough. Only one lower set of rack teeth 90 is shown the bottom segment 32 of one of the two illustrated upright frame members in FIGS. 10 through 15, but it will be appreciated that such rack teeth are provided on all eight inwardly facing sides of the four upright frame members of the up-shaft, and span a substantially full height of the shaft to near the upper track layout.

After or during such retraction of the wheels, further extension of the lifting mechanism actuator is performed to lift the robotic storage/retrieval vehicle into a raised position in which the teeth of the robotic storage/retrieval vehicle's pinion wheels are brought into engagement or immediate adjacency with lowermost rack teeth on the upright frame members of the grid structure, at which point activation of the robotic storage/retrieval vehicle's pinion wheels initiates climbing of the robotic storage/retrieval vehicle upwardly through the up-shaft of the grid structure. The lifting mechanism, being powered by a mains power supply, thus reduces the overall energy load consumed by the on-board power supplies of the storage/retrieval vehicle in its travel from the lower track layout up the upper track layout, as the storage/retrieval vehicle's on-board power supply is not used to lift the robot up to an engagable position with the rack teeth.

To maintain the robotic storage/retrieval vehicle in alignment with the up-shaft during lifting, the lifting platform and underside of the vehicle chassis may have matable male and female features laid out in matching pattern to one another to automatically align with one another when the vehicle is properly centered on the launching spot of the track, whereby raising of the lifting platform mates the male/female features thereon with the matching female/male features on the underside of the vehicle chassis. The mated features prevent the vehicle chassis from sliding around on the lifting platform as it is raised. In one example, four male nipples protrude upwardly from the topside of the lifting platform near the outer corners thereof to mate with four mating recesses in the underside of the vehicle chassis.

Figure 20:
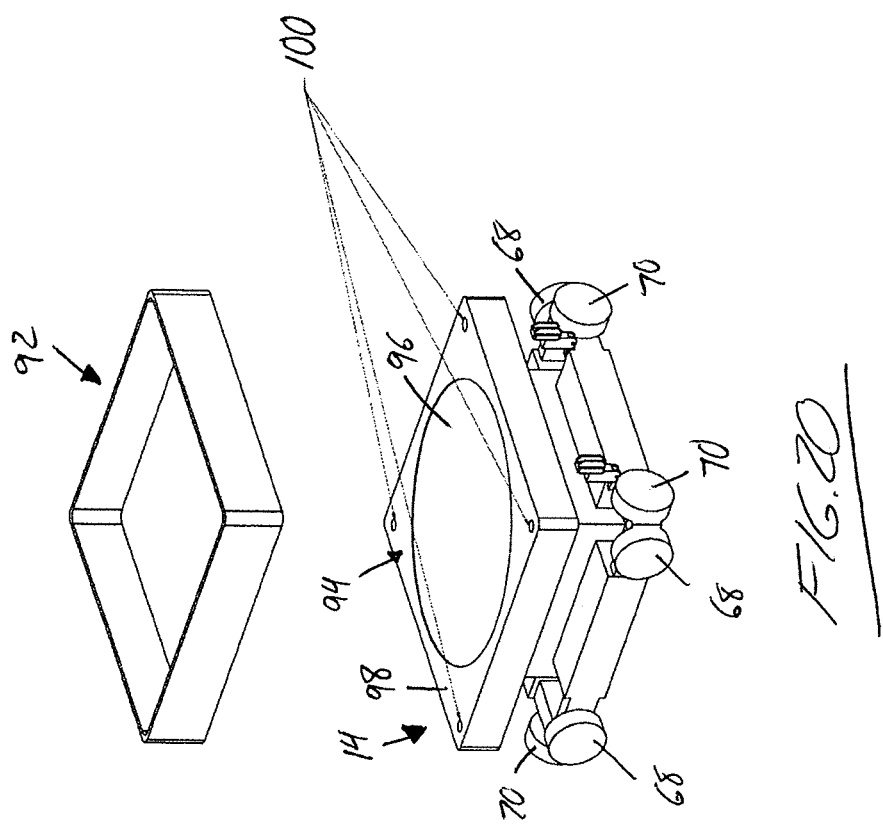
FIGS. 20 and 21 illustrate one of the robotic storage/retrieval vehicles and a compatible storage unit transportable thereon.

FIG. 20 shows one of the robotic storage/retrieval vehicles 14 and a storage unit 92 receivable on the robotic storage/retrieval vehicle for transport thereby within the three-dimensional grid structure and the working stations. In the illustrated example, the storage unit to and from which smaller individual items can be inserted and removed is an open-top tray, though as mentioned elsewhere herein above, an openable/closeable box, bin or tote may alternatively be used. In other embodiments, the storage unit may be the packaging of an individual item, as opposed to a container for storing multiple items therein. In other embodiments, where the grid dimensions and working stations are of larger scale, a storage unit may be a pallet on which one or items are received, whether one relatively large individual item, or a plurality of items. In the example of multiple palleted items, the items may be distributed among multiple containers (e.g. boxes, trays, bins or totes) placed or stacked on the pallet, with one or more items stored in each such container.

As disclosed in Applicant's aforementioned prior PCT application, the robotic storage/retrieval vehicle 14 features an upper support platform 94 on which the storage unit 92 is receivable for carrying by the robotic storage/retrieval vehicle 14, and which may feature a rotatable turret 96 surrounded by a stationary outer deck surface 98. As disclosed in Applicant's aforementioned prior PCT application, the turret may once again have an extendable/retractable arm (not shown), which together with the rotatable function of the turret allows pulling of storage units onto the support platform and pushing of storage units off the support platform at all four sides of the robotic storage/retrieval vehicle so that each vehicle can access a storage unit on any side of any shaft in the three-dimensional grid structure. In the presently illustrated embodiment, the turret and deck surface are shown in simplified form without detail for illustrative simplicity.

Figure 21:
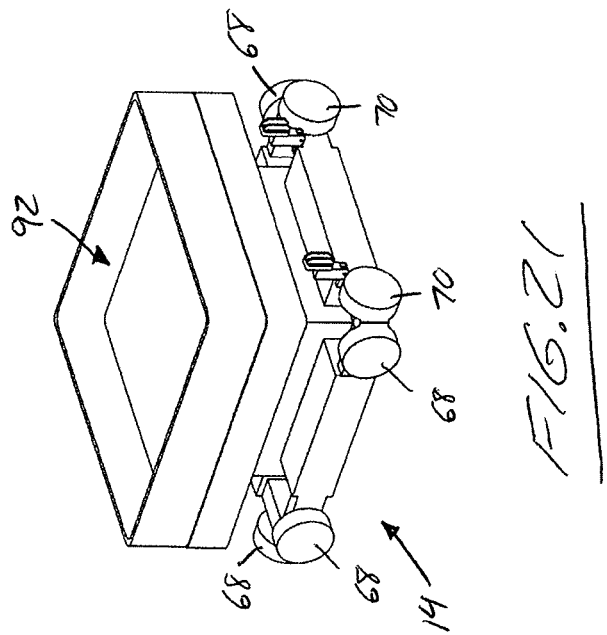

The turret and surrounding deck surface collectively define a square landing area atop which the storage unit is seated when carried on the robotic storage/retrieval vehicle 14. This landing area is equal or similar in size and shape to the underside of each storage unit in the three-dimensional grid structure, as shown by FIG. 21 where the seated position of the storage unit occupies an entirety of the landing area. For the purpose of ensuring that the storage unit is fully received and properly aligned on the landing area of the robotic storage/retrieval vehicle, the upper support platform 94 has a set of load status sensors 100 situated in close proximity to the outer perimeter thereof at spaced apart positions along said perimeter. In the illustrated example, the load sensors are optical sensors recessed in to the upper surface of the landing area, and provided in a quantity of four, each positioned proximate a respective one of the four outer corners of the landing area. As part of a loading routine pulling a storage unit onto the robotic storage/retrieval vehicle from a storage location in the three-dimensional grid using retraction of the extendable/retractable arm, the local processor on the vehicle then checks the status of the four load status sensors for detected presence of the underside of the storage unit above the sensor. A positive detection signal from all four load status sensors thus confirms the presence of the storage unit at all four corners of the landing area, thereby confirming that the storage unit is fully received on the landing area and is in properly squared alignment therewith.

One embodiment uses reflective optical sensors for load status detection, where light energy transmitted by an optical beam emitter of the sensor is reflected off the underside of the storage unit back to an optical receiver of the sensor when the storage unit is present thereover, thus successfully determining said presence. Time of flight calculation (i.e difference in time between emission of an optical pulse and detection of the reflected optical pulse) may be used to differentiate between reflection off the underside of a storage bin seated on the landing area of the robotic storage/retrieval vehicle vs. reflection off another surface further away. It will be appreciated that sensor types other than optical sensors may be employed, for example including limit switches mechanically actuated by contact with the underside of the storage unit, or magnetic sensors actuated by presence of cooperating magnetic elements emitting detectable magnetic fields at the underside of the storage unit. However, optical sensors may be preferable to avoid moving parts or need for magnetic integration or other specialized configuration of the storage units.

As disclosed above, the three-dimensional grid structure used to store inventory items in an order fulfillment center can also be used to buffer fully or partially completed orders within the same inventory storage grid structure. FIG. 22 illustrates a separate three-dimensional sortation/buffering grid that can supplement an inventory storage grid of the type shown in FIG. 2. For example, palletized incoming supply inventory can be depalletized and induced into the inventory storage grid of FIG. 2, from which orders are then picked and packaged into shipping containers, which are then induced into the sortation/buffering grid structure 200 of FIG. 22. the sortation/buffering grid structure 200 features the same three-dimensional framework as the inventory storage grid, thus having matching upper and lower track layouts, and the array of upright frame members therebetween for delimiting storage columns and upright shafts between the two track layouts to enable a fleet of the robotic storage/retrieval vehicles to horizontally traverse each track layout, and vertically traverse the shafts between the two track layouts to access the shelved storage locations therebetween. However, the storage locations in the sortation/buffering grid 200 contain previously packed shipment containers containing the orders picked from the inventory storage grid. The robotic fleet is once again wirelessly controlled via a central computerized control system, for example the same computerized control system shared by the inventory storage grid.

In the illustrated example of FIG. 22, the upper track layout of the sortation/buffering grid 200 is served by a plurality of intake stations 202 co-operably installed therewith for the purpose of loading incoming shipping containers 204 onto robotic storage/retrieval vehicles on the upper track layout. Each intake station may comprise a conveyor 206 on which a series of incoming shipping containers can be queued for induction into the sortation/buffering grid 200, with an outlet end of each conveyor elevated slightly above the upper track layout of the sortation/buffering grid 200 at the outer perimeter thereof by an elevated distance equal to or slightly exceeding the heights of the robotic storage/retrieval vehicles 14. This way, the outlet of each intake conveyor 206 resides at or above an upper horizontal reference plane occupied by the landing areas of the robotic storage/retrieval vehicles when riding on the upper track layout. The intake conveyor can thus slide or drop an incoming shipping container onto the landing area of one of the robotic storage/retrieval vehicles situated at a pickup spot aligned with the outlet end of the intake conveyor at the outer perimeter of the upper track layout.

One or more intake stations may be provided at any one or more perimeter sides of the upper track layout, though as illustrated, the intake stations may all reside at a common side of the upper track layout that's nearest to an on-site inventory storage grid from which the packed shipping containers are arriving, or nearest to one or more intermediate packing stations at which order items amalgamated at the inventory storage grid working stations are subsequently packaged before being forwarding on to the sortation/buffering grid 200. However, it will be appreciated that the two grids need not necessary be located in a shared facility.

The lower track layout of the sortation/buffering grid 200 is served by a plurality of output stations 208 co-operably installed therewith for the purpose of unloading outgoing shipping containers 210 off of robotic storage/retrieval vehicles on the lower track layout. Each output station may comprise a conveyor 212 on which a series of outgoing shipping containers can be queued for transfer to a further downstream location of the facility, for example a final packing area or loading bay at which the containers will be loaded onto a shipping vehicle when available. An inlet end of each output conveyor 212 is situated at or slightly below a lower horizontal plane in which the landing areas of the robotic storage/retrieval vehicles reside when riding on the lower track layout. This way, a robotic storage/retrieval vehicle at a drop-off spot situated at the outer perimeter of the lower track layout in alignment with the inlet end of the conveyor can slide or drop a shipping container from said robotic storage/retrieval vehicle onto the inlet end of the output conveyor. One or more output stations may be provided at any one or more perimeter sides of the upper track layout. The illustrated example features output stations on at least two opposing sides of the lower track layout, for example to respectively feed a pair of loading bays or packing areas optionally situated on opposing sides of the sortation/buffering grid 200.

Each incoming shipping container may be picked up from one of the intake stations by a robotic storage/retrieval vehicle assigned to this pickup task by the computerized control system, and then carried to an available (i.e. currently unoccupied) storage location in the sortation/buffering grid 200 via the respective shaft from which this storage location is accessible, and left at this storage location for later retrieval. Alternatively, instead of commanding the assigned robotic storage/retrieval vehicle to store the incoming shipping container, the computerized control system may command the robotic storage/retrieval vehicle to deliver the shipping container directly to one of the output stations in view of a need or availability at the loading bay or packing area for that shipping container on an urgent basis.

In selecting between these storage and direct output options for the picked-up shipping container, the computerized control system may consult an order priority ranking of an order associated with that shipping container, relative to other orders whose constituent containers have already been inputted to the sortation/buffering grid 200. Additionally or alternatively, if the picked-up shipment container is only a partial component of a larger overall order, then the determination of whether to store the shipping container or deliver it straight to an output station is based at least partly on whether the other shipment containers fulfilling the remainder of the larger overall order are also present, or imminently expected, at the sortation/buffering grid 200. If the entire order is present or imminently present, and there aren't any other orders of higher priority ranking, then the currently picked-up container may be put directly through to the appropriate output station to which the order is assigned by the computerized control system. The other constituent containers of that same order are retrieved from respective storage locations in the sortation/buffering grid 200, if already present therein, and delivered to that same assigned output station, or are assigned for imminent pickup and straight delivery to that output station if said other constituent containers are currently at, or imminently expected at, the input stations.

One particular example of a useful application for the combination of the two three dimensional grids is aisle-based or similar location-based kitting operations, for example where different retail items destined for a retailer are picked in groups from the inventory storage grid according to a particular aisle section or other identifiable sub-region of the retailer's store layout for which the particular items are destined. The different groups are packed into different shipping containers, and then fed individually into the sortation/buffering grid for temporary storage (i.e. buffering) as each such picked group of items is picked and packaged. Exiting the inventory storage grid, the connected working stations thereof, or subsequent packing station(s) located further downstream from the inventory storage grid at different times, the shipping containers arrive at the sortation/buffering grid at staggered points in time, with one or more initially received containers potentially arriving much earlier than a subsequently received remainder of said containers, and so the earlier received packages are temporarily stored (i.e. buffered) in the sortation/buffering grid, at least until such time as the remainder of containers are received by or imminently approaching the sortation/buffering grid. At such time, the previously-buffered initially-received shipping containers are retrieved from their respective storage locations in the sortation/buffering grid 200 and delivered to a common output station by one or more of the robotic storage/retrieval vehicles for amalgamation (e.g. palletization) into the completed order ready for shipment to the retailer.

This however, is only one non-limiting example of the usefulness of the sortation/buffering grid 200, the use of which is not specifically limited to use with a inventory storage solution specifically using the three-dimensional grid structure employed in the present invention and Applicant's aforementioned prior PCT application. Also, aisle-based kitting for retailers is only one example, and non-retail customers similarly having an aisle-based or similarly mapped organizational layout with different identifiable sub-regions may likewise benefit from kitted delivery. This may include manufacturers with organized storage for incoming raw materials or pre-fabricated componentry from outside suppliers, where kitted shipment containers are destined for such on-site manufacturer storage, from which the raw materials or pre-fabricated componentry are distributed to one or more manufacturing stations in the facility. The kitting approach may also be used where the manufacturing stations themselves are the different identifiable sub-regions for which the kitted materials or componentry are destined according to the supply needs of such stations, whether these stations are different stages within one product line, or full or partial assembly stations for two different product lines.

In another example, such manufacturing facilities could have the inventory storage grid of FIG. 2 on site for kitting of raw materials and/or componentry, either with or without the downstream sortation/buffering grid 200, to feed kit-populated storage units to the manufacturing stations at the same facility.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A storage system comprising:
a gridded three-dimensional structure comprising:
in a lowermost level of said gridded three-dimensional structure, a gridded lower track layout that occupies a two-dimensional area and on which one or more storage/retrieval vehicles are conveyable in two directions over said two-dimensional area; and
a plurality of storage columns residing above the gridded lower track layout in spaced distribution over the two-dimensional area of said lower track layout, each column comprising a plurality of storage locations arranged one over another and sized to accommodate placement and storage of storage units therein; and
a plurality of upright shafts residing above the gridded lower track layout in spaced distribution over the two dimensional area of said lower track layout, each storage column being neighboured by a respective one of the upright shafts through which the storage locations of said storage column are accessible by the one or more storage/retrieval vehicles to place or remove the storage units to or from said storage locations of said storage column; and
at least one working station residing alongside the gridded three-dimensional structure and outside the two-dimensional area of the lower track layout over which the storage columns and upright shafts are distributed, said working station being joined to the gridded lower track layout by an extension track thereof by which said one or more storage/retrieval vehicles are conveyable between said working station and said lower track layout, whereby conveyance of the storage units between the storage locations and the working station is performable entirely by said one or more storage/retrieval vehicles;
wherein said extension track is connected to the gridded three-dimensional structure at said gridded lower track layout in the lowermost level of said gridded three dimensional structure, said extension track runs through said working station and comprises a plurality of discrete spots therein that are each sized to be respectively occupiable by an individual one of said storage/retrieval vehicles, said working station comprises a countertop that resides overhead of the extension track, and said plurality of discrete spots include an access spot overtop of which said countertop is penetrated by an access opening through which a carried storage unit on said one of the storage/retrieval vehicles is accessible when parked at said access spot, and at least one additional spot that is fully covered by said countertop.

2. The storage system of claim 1 wherein the extension track of the working station is an only vehicle-ridable track of said working station, and is connected to the gridded three-dimensional structure solely at the gridded lower track layout of the lowermost level thereof.

3. The storage system of claim 1 wherein said extension track is connected to the lower track layout of the gridded three-dimensional structure at two opposing ends of said extension track, whereby each storage/retrieval vehicle can traverse the extension track in a direction emerging from the gridded three-dimensional structure at a first end of the extension track and re-entering the gridded three-dimensional structure at a second end of the extension track, and the system further comprises at least one processor configured to generate signals instructing one of the storage retrieval vehicles to enter the working station at said first end of the extension track, to thereafter perform sequential advancement through said discrete spots toward the second end of the extension track, to temporarily park at the access spot during said sequential advancement through said discrete spots, and to thereafter exit the working station and re-enter the gridded three-dimensional structure at said second end of the extension track.

4. The storage system of claim 1 wherein the extension track, at all sides thereof other than an inner side at which said extension track is connected to the gridded lower track layout, is fully enclosed.

5. The storage system of claim 1 wherein the extension track passes through the working station from an entrance situated at or adjacent one end thereof to an exit situated at or adjacent an opposing end thereof, and the system comprises at least one processor configured to generate signals instructing one of the storage retrieval vehicles to enter the working station at said entrance, to thereafter perform sequential advancement through said discrete spots toward the exit, to temporarily park at the access spot during said sequential advancement through said discrete spots, and to thereafter exit the working station and re-enter the gridded three-dimensional structure at said exit.

6. The storage system of claim 1 wherein said at least one working station comprises a plurality of working stations each linked to the gridded lower track layout by a respective extension track.

7. The system of any claim 1 comprising at least one processor configured to organize sequenced delivery of a group of storage units from the three-dimensional gridded structure to the access spot of the working station, including:
(a) generating signals to instruct a plurality of storage/retrieval vehicles to retrieve the storage units from respective the storage locations;
(b) identifying, from among the plurality of storage/retrieval vehicles, a first storage/retrieval vehicle of a higher ranked sequence priority than a second storage/retrieval vehicle;
(c) commanding said first storage/retrieval vehicle to advance to, and park at, said access spot on the extension track;
(d) commanding said second storage/retrieval vehicle to advance to, and temporarily park at, a nearby one of the discrete spots that is situated near said access spot; and
(e) upon departure of said first storage/retrieval vehicle from said access spot, commanding said second storage/retrieval vehicle to advance to, and park at, said access spot.

8. A storage system comprising:
a plurality of storage/retrieval vehicles;
a gridded three-dimensional structure comprising:
a gridded track layout that occupies a two-dimensional area and on which the storage/retrieval vehicles are conveyable in two directions over said two-dimensional area;
a plurality of storage columns residing above or below the gridded track layout in spaced distribution throughout the two-dimensional area of said track layout, each column comprising a plurality of storage locations arranged one over another and sized to accommodate placement and storage of storage units therein; and
a plurality of upright shafts residing above or below the gridded track layout in spaced distribution within the two-dimensional area of said track layout, each storage column being neighboured by a respective one of the upright shafts through which the storage locations of said storage column are accessible by the storage/retrieval vehicles to place or remove the storage units to or from said storage locations of said storage column; and at least one working station residing outside the two-dimensional area of the track layout within which the storage columns and upright shafts are distributed;

wherein:

conveyance of the storage units between the at least one working station and the storage locations in the gridded three-dimensional structure is performed solely by said storage/retrieval vehicles;

said working station is joined to the gridded track layout by an extension track thereof by which said storage/retrieval vehicles are conveyable between said working station and said lower track layout;

said extension track comprises a plurality of discrete spots that are located within the working station and are each sized to be respectively occupiable by an individual one of said storage/retrieval vehicles, and that include an access spot and one or more additional spots;

said working station, at least at all sides thereof other than an inner side of the working station at which said extension track is connected to the gridded track layout, is fully enclosed at each of said one or more additional spots;

said working station, at said access spot, has an access opening that penetrates into the working station to enable access to a carried storage unit on said one of the storage/retrieval vehicles when parked at said access spot; and the system further comprises at least one processor configured to organize sequenced delivery of a group of storage units from the three-dimensional gridded structure to the access spot of the working station, including:

(a) generating signals to instruct the plurality of storage/retrieval vehicles to retrieve the group of storage units from respective the storage locations;

(b) identifying, from among the plurality of storage/retrieval vehicles, a first storage/retrieval vehicle of a higher ranked sequence priority than a second storage/retrieval vehicle;

(c) commanding said first storage/retrieval vehicle to advance to, and park at, said access spot on the extension track;

(d) commanding said second storage/retrieval vehicle to advance to, and park at, a nearby one of the discrete spots that is situated near said access spot; and (e) upon departure of said first storage/retrieval vehicle from said access spot, commanding said second storage/retrieval vehicle to advance to, and park at, said access spot.

9. A storage system comprising:

a plurality of storage/retrieval vehicles;

a three-dimensional structure comprising a three-dimensional array of storage locations sized to accommodate placement and storage of storage units therein, said storage vehicles being configured to navigate within said three dimensional structure and place and retrieve said storage units to and from said storage locations; and at least one working station to which retrieved storage units from the storage locations are conveyable by said storage/retrieval vehicles;

wherein each working station comprises an enclosure through which said storage/retrieval vehicles are conveyable on a track that comprises a plurality of discrete spots that are located within said enclosure and are each sized to be respectively occupiable by an individual one of said storage/retrieval vehicles, said plurality of discrete spots including an access spot and one or more additional spots, of which only said access spot is equipped with an access opening in said enclosure through which a carried storage unit on said one of the storage/retrieval vehicles is accessible when said vehicle is parked at said access spot, while said one or more additional spots are each fully enclosed, at least at all sides of the working station other than an inner side thereof at which said track connects to the three-dimensional structure; and wherein the system further comprises at least one processor configured to organize sequenced delivery of a group of storage units from the three-dimensional gridded structure to the access spot of the working station, including:

(a) generating signals to instruct the plurality of storage/retrieval vehicles to retrieve the group of storage units from respective the storage locations;

(b) identifying, from among the plurality of storage/retrieval vehicles, a first storage/retrieval vehicle of a higher ranked sequence priority than a second storage/retrieval vehicle;

(c) commanding said first storage/retrieval vehicle to advance to, and park at, said access spot;

(d) commanding said second storage/retrieval vehicle to advance to, and park at, a nearby one of the discrete spots that is situated near said access spot; and (e) upon departure of said first storage/retrieval vehicle from said access spot, commanding said second storage/retrieval vehicle to advance to, and park at, said access spot.

10. The storage system of claim 9 wherein said one or more additional spots comprise an entrance spot and an exit spot between which the access spot resides, and the at least one processor is configured to:

during commandment of each of the first and second storage/retrieval vehicles:

command entrance thereof to the working station at the entrance spot;

thereafter command sequential advancement through said discrete spots toward the exit spot;

during said sequential advancement, command temporary parking at said access spot; and thereafter command exit from the working station and re-entry to the three-dimensional structure via said exit spot.

11. The storage system of claim 9 wherein the access opening resides in overhead relation to the access spot, and said working station comprises a countertop that fully covers said one or more additional spots, but that is penetrated by the access opening.

* * * * *